United States Patent
Tseng et al.

(10) Patent No.: US 8,542,788 B2
(45) Date of Patent: Sep. 24, 2013

(54) BLIND SCAN SYSTEM AND METHOD IN A DVB-S SYSTEM

(75) Inventors: Chun-Chieh Tseng, Gueishan Township, Taoyuan County (TW); Po-Fang Huang, Yuanlin Township, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 436 days.

(21) Appl. No.: 12/926,063

(22) Filed: Oct. 25, 2010

(65) Prior Publication Data

US 2011/0135042 A1 Jun. 9, 2011

(30) Foreign Application Priority Data

Dec. 8, 2009 (TW) .............................. 98141858 A

(51) Int. Cl.
- *H04L 7/00* (2006.01)
- *H04J 3/26* (2006.01)
- *H04N 7/10* (2006.01)

(52) U.S. Cl.
USPC .............................. 375/372; 370/432; 725/34

(58) Field of Classification Search
USPC ......................... 375/372; 370/432
See application file for complete search history.

(56) References Cited

U.S. PATENT DOCUMENTS

| | | | | |
|---|---|---|---|---|
| 5,724,396 | A * | 3/1998 | Claydon et al. | 375/355 |
| 6,223,268 | B1 * | 4/2001 | Paluch et al. | 711/201 |
| 6,629,288 | B1 * | 9/2003 | Bernath et al. | 714/807 |
| 6,744,830 | B1 * | 6/2004 | Furukawa et al. | 375/345 |
| 7,280,619 | B2 * | 10/2007 | Nemer et al. | 375/323 |
| 2002/0069406 | A1 * | 6/2002 | Aaltonen et al. | 725/34 |
| 2004/0234019 | A1 * | 11/2004 | Kim et al. | 375/372 |
| 2005/0041679 | A1 * | 2/2005 | Weinstein et al. | 370/432 |
| 2005/0264704 | A1 * | 12/2005 | Leinonen | 348/723 |
| 2007/0098089 | A1 * | 5/2007 | Li et al. | 375/260 |

* cited by examiner

*Primary Examiner* — Leon-Viet Nguyen
*Assistant Examiner* — Sarah Hassan
(74) *Attorney, Agent, or Firm* — Bacon & Thomas, PLLC

(57) ABSTRACT

A blind scan system in a DVB-S system includes a spectrum parameter extractor to fetch and calculate a coarse carrier frequency offset and coarse symbol rate of a signal; a digital mixer to depend on the coarse frequency offset to shift the center of a spectrum of the signal to a position where a DC part of a working spectrum of a digital matched filter locates, so as to produce an offset signal; and an interpolator to perform a down-sampling on the offset signal according to the coarse symbol rate in order to improve the in-band signal-to-noise ratio of the digital matched filter and mitigate impacts due to adjacent channel interferences. Thus, the fine carrier frequency offset and fine symbol rate estimation can be performed accurately.

26 Claims, 22 Drawing Sheets

BLIND SCAN SYSTEM AND METHOD IN A DVB-S SYSTEM

BACKGROUND OF THE INVENTION

1. Field of the Invention

The present invention relates to the technical field of satellite television transmission and, more particularly, to a blind scan system and method in a Digital Video Broadcasting-Satellite (DVB-S) system.

2. Description of Related Art

In developing digital televisions, one of essential tasks is to establish a digital platform. In addition to pure hardware equipments such as a set-top box or television set, the digital platform needs to include digital channels and contents.

Current specifications for global digital televisions are grouped essentially into several types according to market segments: Advanced Television Systems Committee (ATSC) systems for American-based markets, Digital Video Broadcasting (DVB) systems for Euro-based markets, Digital Terrestrial Multimedia Broadcasting (DTMB) systems for China-based markets, and ISDB-T systems for Japan-based markets. The DVB systems can be further divided into DVB-C (Cable) providing the wired television standards, DVB-S (Satellite) providing the satellite television standards, and DVB-T (Terrestrial) providing the terrestrial wireless television standards.

An official system provider can transmit a DVB-S signal to a satellite antenna disposed on a building through a satellite located over 32000 km and above. In this case, a quadrature phase shift keying (QPSK) is applied to transmit MPEG2 data, and a multi-channel carrier frequency and symbol rate can be pre-stored in a receiver in order to rapidly receive the programs.

However, when the carrier frequency and symbol rate are changed for an updated channel, such a way is unable to receive the programs on the updated channel smoothly. Accordingly, for such a DVB-S receiver, a blind scan function is required in order to provide a simple operating mode to thereby allow a user to have an automatic program scan without knowing the detailed parameters of programs received by a satellite in advance. Scan speed and accuracy of parameter estimation are the most important factors in evaluating the performance of a blind scan procedure. Rapid scan reduces waiting time of a user in the procedure.

FIG. 1 is a block diagram of a typical receiver. As shown in FIG. 1, the operation principle is first to use the controller 11 for tuning the analog tuner 12 to a carrier frequency (CF). Next, the filter bank (not shown) and the timing recovery loop (not shown) in the baseband demodulation chip 13 are started to operate with the least symbol rate. The symbol rate is increased when the loop cannot converge. When the symbol rate is over a preset maximum and the loop cannot converge, it indicates that there is no signal at this frequency, and in this case the carrier frequency of the analog tuner is updated by adding a step to the original basis. Accordingly, the above process is repeated until the loop converges and the signal and associated parameters are detected.

Such a process has the disadvantage of very slow scan speed. Since the possible symbol rate used by a DVB-S system may be varied in a very wide range, such as from 1M to 45M bauds, and a satellite signal occupies a quite wide spectrum, such as an input range from 950 MHz to 2150 MHz for a Ku band tuner, so that the combination produces numerous possibilities. Accordingly, it requires long time to complete the entire possibility scan once through the blind scan procedure. In addition, it takes much time to change the carrier frequency of the analog tuner 12, which significantly prolongs the scan time due to the frequent step carrier frequencies. Further, the step resolution of the analog tuner is limited to, typically hundreds of KHz. Thus, only changing the frequency of the analog tuner cannot accurately detect the carrier frequency. Moreover, the convergence of the loop is very slow, so that loop-scanning the symbol rate is quite slow. Therefore, the typical frequency scan has a very slow scan speed.

Accordingly, it is desirable to provide an improved blind scan system and method to mitigate and/or obviate the aforementioned problems.

SUMMARY OF THE INVENTION

The object of the present invention is to provide a blind scan system and method in a Digital Video Broadcasting-Satellite (DVB-S) system, which calculates a carrier frequency offset (CFO) and symbol rate (SR) of each channel and overcomes the prior problem of being restricted by the step resolution of the analog tuner.

According to a feature of the invention, a blind scan system for a Digital Video Broadcasting-Satellite (DVB-S) system is provided, which includes an analog tuner, an analog to digital converter (ADC), a digital mixer, a digital auto-gain controller (DAGC), a digital matched filter (DMF), a spectrum computation device, a spectrum parameter extractor and a controller. The analog tuner is connected to the controller in order to receive a radio frequency (RF) signal of an antenna and shift the RF signal down to a baseband based on an analog carrier frequency offset to thereby produce an analog baseband signal. The ADC is connected to the analog tuner in order to convert the analog baseband signal into a digital baseband signal. The digital mixer receives the digital baseband signal of a target channel and uses a digital carrier frequency offset to perform a frequency shifting on the digital baseband signal to thereby produce an offset baseband signal. The digital AGC is connected to the digital mixer in order to perform an auto-gain adjustment on the offset baseband signal to thereby produce a gain adjusted baseband signal. The digital matched filer is connected to the digital AGC in order to filter the gain adjusted baseband signal to thereby produce a filtered baseband signal. The spectrum computation device is connected to the digital matched filter in order to calculate and produce a spectrum of the filtered baseband signal. The spectrum parameter extractor is connected to the spectrum computation device and the controller in order to calculate cross points of the spectrum of the filtered baseband signal with a threshold according to a control signal generated by the controller to thereby calculate a coarse carrier frequency offset and coarse symbol rate of the digital baseband signal. The controller is connected to the analog tuner, the digital mixer, the spectrum computation device and the spectrum parameter extractor in order to depend on the search range of spectrum to arrange the analog carrier frequency offset of the analog tuner to thereby determine whether a signal is detected in the spectrum generated by the DMF. When the signal is not detected, the controller continuously tunes the analog tuner to frequency shift a main component of a signal under test to the working bandwidth of the DMF. The controller obtains parameters of the signal under test, uses the coarse symbol rate of the spectrum to calculate the digital carrier frequency offset of the spectrum, and arranges the digital mixer for performing a frequency shifting on the digital baseband signal.

According to another feature of the invention, a blind scan procedure in a Digital Video Broadcasting-Satellite (DVB-S)

system is provided. The method includes the steps of: (A) initializing system parameters; (B) tuning an analog tuner to fetch a section of spectrum according to a search range of spectrum; (C) tuning the analog tuner for moving a spectrum of a signal under test, and configuring a digital mixer for performing a frequency shifting on a digital baseband signal to produce an offset baseband signal; (D) using a controller to determine whether a signal is detected, and, if yes, executing step (E), otherwise executing step (G); (E) determining whether a spectrum of the signal is contained in a digital matched filter (DMF) and, if yes, executing step (F), otherwise executing step (G); (F) extracting parameters of the spectrum of the signal, calculating a digital carrier frequency offset of the spectrum contained in the DMF according to a coarse carrier frequency offset of the spectrum contained in the DMF, and configuring the digital mixer to perform the frequency shifting on the digital baseband signal; (G) determining whether the section of spectrum is completely scanned and, if yes, executing step (H), otherwise executing step (I); (H) determining whether the search range of spectrum is completely scanned when the section of spectrum is completely scanned, and, if yes, ending the method, otherwise tuning the analog tuner to fetch a next section of spectrum and executing step (C); and (I) tuning the analog tuner for moving the spectrum of the signal under test, configuring the digital mixer for performing the frequency shifting on the digital baseband signal to produce an offset baseband signal, and executing step (D).

Other objects, advantages, and novel features of the invention will become more apparent from the following detailed description when taken in conjunction with the accompanying drawings.

BRIEF DESCRIPTION OF THE DRAWINGS

FIGS. 8(A) to 11 are schematic diagrams of an operation of FIG. 7 according to an embodiment of the invention;

FIGS. 13(A) to 16 are schematic diagrams of an operation of FIG. 12 according to another embodiment of the invention.

DETAILED DESCRIPTION OF THE PREFERRED EMBODIMENT

Figure 1:
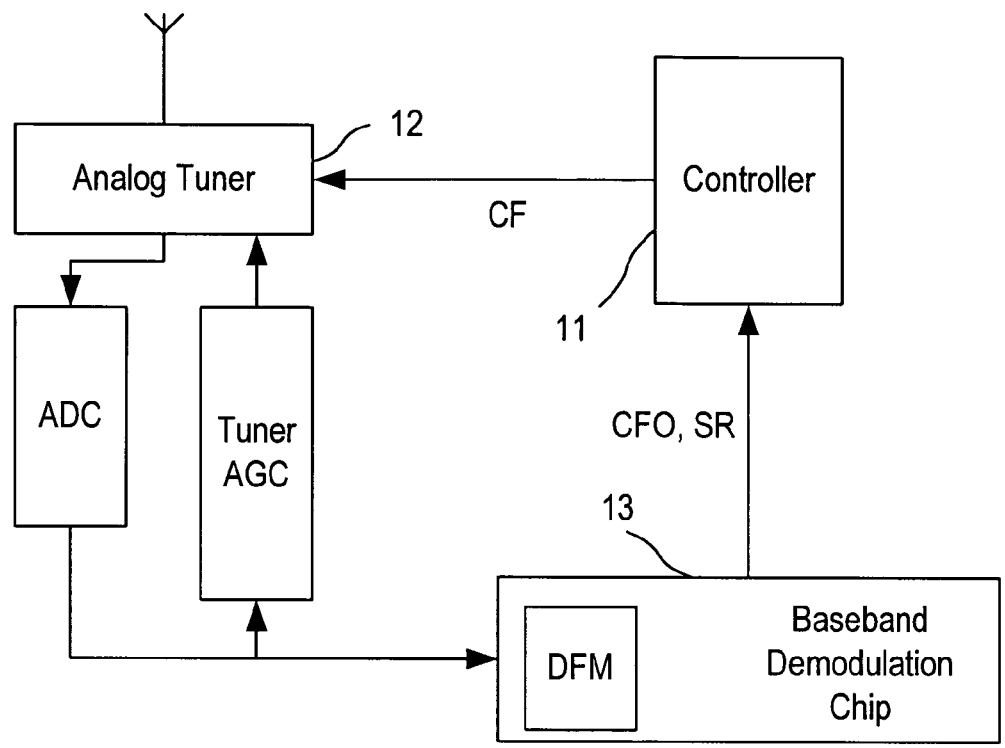
FIG. 1 is a block diagram of a typical receiver.
Figure 2:
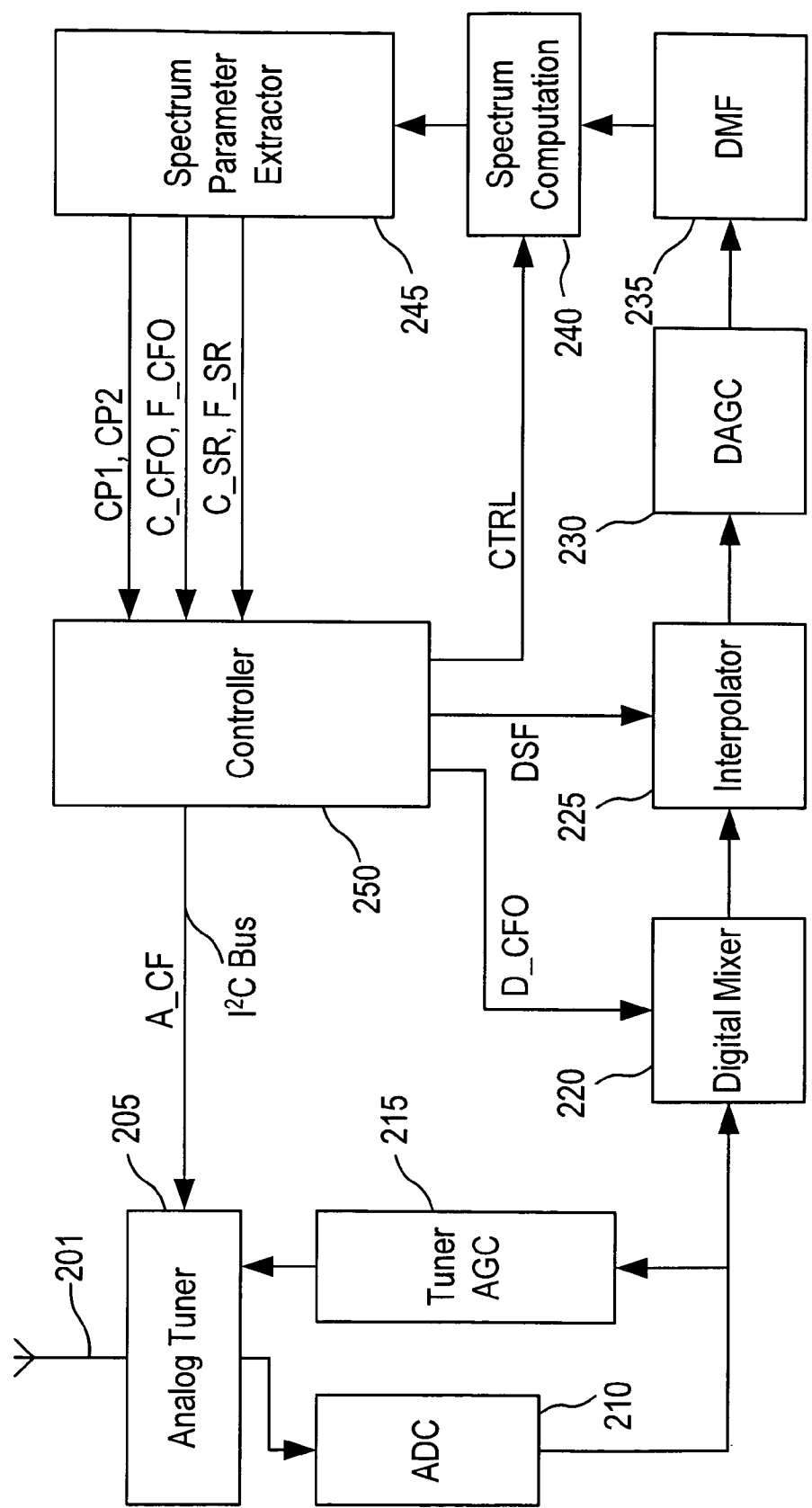
FIG. 2 is a block diagram of an application system with a blind scan procedure in a DVB-S system according to an embodiment of the invention.

FIG. 2 is a block diagram of a blind scan system in a DVB-S system according to an embodiment of the invention. The blind scan system includes an analog tuner 205, an analog to digital converter (ADC) 210, a tuner auto-gain controller (AGC) 215, a digital mixer 220, an interpolator 225, a digital auto-gain controller (DAGC) 230, a digital matched filter (DMF) 235, a spectrum computation device 240, a spectrum parameter extractor 245 and a controller 250.

The analog tuner 205 is connected to the controller 250 in order to receive a radio frequency (RF) signal of an antenna 201, and depends on an analog carrier frequency offset A_CFO designated by the controller 250 to tune the RF signal down to a baseband to thereby produce an analog baseband signal. The analog tuner 205 is connected to the controller 250 through a bus (not shown). The bus is typically an $I^2C$ bus. The analog tuner 205 has a channel filter (not shown). The bandwidth of the channel filter is set to be 60 MHz. The controller 250 configures the channel filter through an $I^2C$ bus for acquiring a certain RF band of signal.

The ADC 210 is connected to the analog tuner 205 in order to down-convert the analog baseband signal into a digital baseband signal. The operating frequency of the ADC 210 is set to be 90 MHz.

The tuner auto-gain controller (AGC) 215 is connected to the ADC 210 and the analog tuner 205 in order to automatically tune a gain of the analog tuner 205 based on the digital baseband signal to thereby adjust automatically the amplitude of the analog baseband signal to meet with the input dynamic range of the ADC 210.

The digital mixer 220 is connected to the ADC 210 and the controller 250 in order to receive a digital baseband signal out of ADC 210. The digital mixer 220 depends on a digital carrier frequency offset D_CFO designated by the controller 250 to perform a frequency shifting on the input digital baseband signal to thereby produce an offset baseband signal.

The interpolator 225 is connected to the digital mixer 220 and the controller 250 in order to perform an interpolation operation on the offset baseband signal according to a down-sampling factor (DSF) designated by the controller 250, so as to produce an interpolated offset baseband signal. The interpolator includes a cascaded integrator and comb filter (CIC) to thereby perform an anti-aliasing and cancel adjacent channel interference.

The DAGC 230 is connected to the interpolator 225 in order to perform an auto-gain adjustment on the interpolated offset baseband signal to thereby produce a gain adjusted baseband signal.

The digital matched filer (DMF) 235 is connected to the DAGC 230 in order to filter the gain adjusted baseband signal to thereby produce a filtered baseband signal. The operating bandwidth or working spectrum of the DMF 235 is a half of the operating frequency of the ADC 210. Namely, the operating bandwidth of the DMF 235 is preset to be 45 MHz. The DMF 235 is set to be a square root raised cosine filter (SRRC) with rolloff factor 0.35 and oversampling factor 2. The transition band of the DMF 235 cannot have a 90-degree steep, and accordingly two boundaries B1, B2 are arranged in operation. The boundaries B1, B2 are decided based on the passband of the DMF 235. The boundary B2 is around at the left side of the working bandwidth of the DMF 235, and the boundary B1 is at the right side of the working bandwidth of the DMF 235.

The spectrum computation device 240 is connected to the digital matched filter 235 and the controller 250 in order to calculate and produce a spectrum of the filtered baseband signal.

Figure 3:
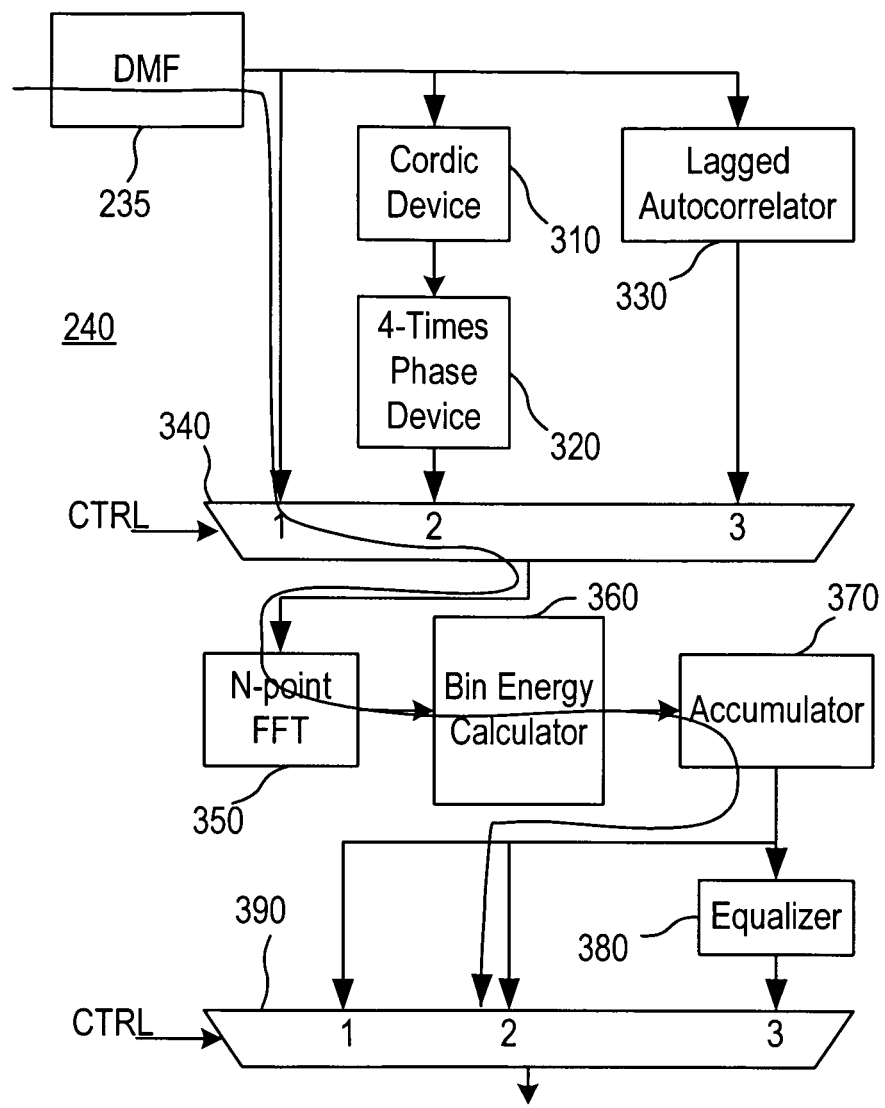
FIG. 3 is a block diagram of a spectrum computation device according to an embodiment of the invention.

FIG. 3 is a block diagram of the spectrum computation device 240 according to an embodiment of the invention. In FIG. 3, the spectrum computation device 240 includes a Cordic device 310, a 4-times phase device 320, a lagged autocorrelator 330, a first multiplexer 340, an N-point fast Fourier transform device 350, a bin energy calculator 360, an accumulator 370, an equalizer 380 and a second multiplexer 390.

The Cordic device 310 is connected to the digital matched filter (DMF) 235 in order to receive the filtered baseband signal and perform a Cordic operation on the filtered baseband signal to thereby obtain the phase for every sampling point on the filtered baseband signal.

The 4-times phase device 320 is connected to the Cordic device 310 and a second input terminal of the first multiplexer 340 in order to perform a 4-times phase operation on a signal generated by the Cordic device to thereby produce a result to the second input terminal of the first multiplexer 340.

The lagged autocorrelator 330 is connected to the DMF 235 and a third input terminal of the first multiplexer 340 in order to receive the filtered baseband signal to thereby calculate an autocorrelation signal for the filtered baseband signal and generate the autocorrelation signal to the third input terminal of the first multiplexer 340. The lagged autocorrelator 330 receives the filtered baseband signal $r_n$ and generates a signal expressed as $r_n \times (r_{n-1})^*$, where n indicates a sample index at FFT input and * denotes complex conjugates.

The first multiplexer 340 has a control terminal connected to the controller 250 for receiving a control signal CTRL, and has a first input terminal connected to the DMF 235 for receiving the filtered baseband signal. The first multiplexer 340 selects an input signal from its first, second or third input terminal as an output signal based on indication of the control signal.

The N-point fast Fourier transform (N-FFT) device 350 is connected to the first multiplexer 340 in order to perform a Fourier transform on the output signal of the first multiplexer 340.

The bin energy calculator 360 is connected to the N-FFT 350 in order to calculate the energy of each bin out of N-FFT.

The accumulator 370 is connected to the bin energy calculator 360 in order to accumulate output signals of the bin energy calculator 360 to thereby obtain an averaged spectrum.

The equalizer 380 is connected to the accumulator 370 in order to perform an equalization operation over the averaged spectrum to thereby equalize amplitude of spectrum under estimation for accurately and fairly finding the peak position on the subsequent peak detection.

The second multiplexer 390 has a control terminal connected to the controller 250 for receiving the control signal CTRL, a first input terminal and a second input terminal connected to an output terminal of the accumulator 370, and a third input terminal connected to an output terminal of the equalizer 380 for depending on the control signal CTRL to select input signals from its first and second input terminals or an input signal from its third terminal as an output signal.

When the control signal indicates a value "1", the filtered baseband signal generated by the DMF 235 passes through the N-FFT 350, the bin energy calculator 360 and the accumulator 370. In this case, the spectrum computation device 240 generates the spectrum of the filtered baseband signal.

When the control signal indicates a value "2", the filtered baseband signal generated by the DMF 235 passes through the Cordic device 310, the 4-times phase device 320, the N-FFT 350, the bin energy calculator 360 and the accumulator 370. In this case, the phase of each sampling point on the filtered baseband signal is first calculated by the Cordic device 310, then processed by the 4-times phase device 320, and finally computed by the N-FFT to thereby produce a peak at $4f_\Delta$. Accordingly, the spectrum parameter extractor 245 can use a peak location detecting technique to identify frequency offset which is referred to as a fine carrier frequency offset F_CFO.

When the control signal indicates a value "3", the filtered baseband signal generated by the DMF 235 passes through the lagged autocorrelator 330, the N-FFT 350, the bin energy calculator 360, the accumulator 370 and the equalizer 380 to thereby obtain an output signal with a peak at a symbol rate. Accordingly, the spectrum parameter extractor 245 can use the peak location detecting technique to find the symbol rate which is referred to as a fine symbol rate F_SR. The accuracy of the fine carrier frequency offset F_CFO and fine symbol rate F_SR is determined by the point number (N) of FFT 350.

The spectrum parameter extractor 245 is connected to the spectrum computation device 240 and the controller 250 in order to calculate the cross points CP1, CP2 of an output spectrum by the device 240 with a threshold, and to calculate the carrier frequency offsets F_CFO, C_CFO of the output spectrum and the symbol rates F_SR, C_SR of the digital baseband signal.

Figure 4:
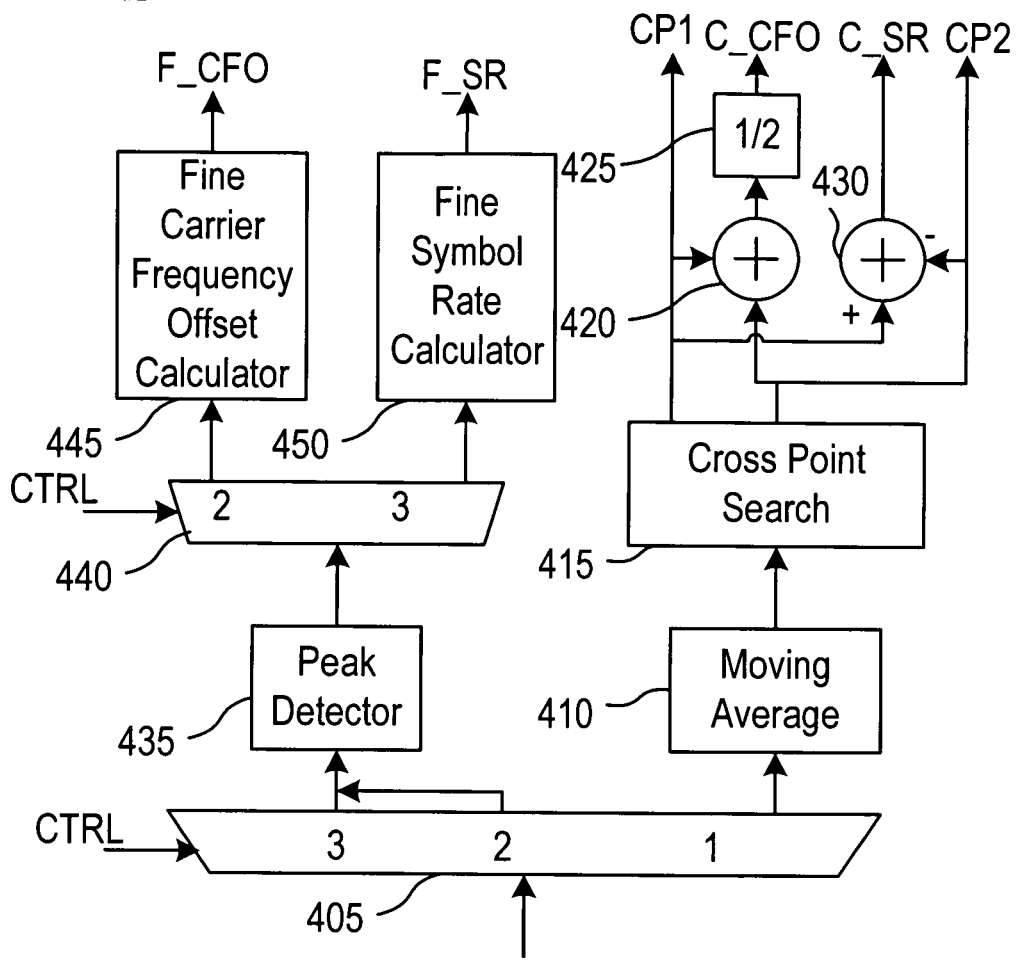
FIG. 4 is a block diagram of a spectrum parameter extractor according to an embodiment of the invention.

FIG. 4 is a block diagram of the spectrum parameter extractor 245 according to an embodiment of the invention. In FIG. 4, the spectrum parameter extractor 245 includes a first de-multiplexer 405, a moving average device 410, a cross point search device 415, an adder 420, a divider 425, a subtractor 430, a peak detector 435, a second de-multiplexer 440, a fine carrier frequency offset calculator 445 and a fine symbol rate calculator 450.

The first de-multiplexer 405 is connected to the spectrum computation device 240 and the controller 250 in order to generate an output signal of the spectrum computation device 240 through its first, second or third output terminal according to the control signal CTRL generated by the controller 250.

The moving average device 410 is connected to the first output terminal of the first demultiplexer 405 in order to perform a moving average operation on a spectrum of the output signal of the device 240 to thereby produce a smooth spectrum.

The cross point search device 415 is connected to the moving average device 410 in order to find first and second cross points CP1, CP2 of the smooth spectrum with a threshold. The first cross point CP1 indicates a position where the amplitude of the smooth spectrum is over the threshold at first time, and the second cross point CP2 indicates a position where the amplitude of the smooth spectrum is below the threshold at first time. The threshold can be expressed as follows:

$$TH = (Max - Min) \times \eta + Min,$$

where TH indicates the threshold, Max indicates the amplitude maximum of the smooth spectrum between two mask indexes MP1 and MP2, Min indicates the amplitude minimum of the smooth spectrum between the mask indexes MP1 and MP2, and $\eta$ indicates a second tuning factor, for $0 \leq \eta \leq 1$ and $\eta$ is preferably 0.3. The controller 250 locates the first mask index MP1 at a position where a half of the bandwidth BW is subtracted from the DC part of the DMF 235. For example, if the working bandwidth BW of the DMF 235 is 45 MHz, the first mask index MP1 is located at −22.5 MHz. The second mask index MP2 is located at the same frequency as the first boundary B1 or at the right side of the first mask index MP1 by one step size. For example, if the first mask index MP1 is located at −22.5 MHz and the step size is 3 MHz, the second mask index MP2 is located at −19.5 Mhz.

The adder 420 is connected to the cross point search device 415 in order to add the first and second cross points CP1 and CP2. The divider 425 is connected to the adder 420 in order to divide an output signal of the adder 420 by two so as to produce the coarse carrier frequency offset C_CFO.

The subtractor 430 is connected to the cross point search device 415 in order to subtract the second cross point CP2 from the first cross point CP1 to thereby produce the coarse symbol rate C_SR for the digital baseband signal.

The peak detector 435 is connected to the second and third output terminals of the first demultiplexer 405 in order to perform a peak detection on an output spectrum of the spectrum computation device 240 to thereby produce a peak location index for the output spectrum.

The second de-multiplexer 440 is connected to the peak detector 435 in order to depend on the control signal CTRL to select its second or third output terminal to generate the output signal of the peak detector.

The fine carrier frequency offset calculator 445 is connected to a second output terminal of the second demultiplexer 440 in order to calculate a fine carrier frequency offset F_CFO according to a peak location index corresponding to the detected maximal peak.

The fine symbol rate calculator 450 is connected to the second demultiplexer 440 in order to calculate a fine symbol rate F_SR according to the peak location index corresponding to the detected maximal peak.

The controller 250 is connected to the analog tuner 205, the digital mixer 220, the spectrum computation device 240 and the spectrum parameter extractor 245. The controller 250 sends a control signal CTRL to the spectrum computation device 240 and the spectrum parameter extractor 245. The spectrum computation device 240 and the spectrum parameter extractor 245 calculate and produce the first cross point CP1, the second cross point CP2, the coarse carrier frequency offset, the fine carrier frequency offset, the coarse symbol rate, and the fine symbol rate and send them to the controller 250. The controller 250 determines whether a signal is detected in the spectrum generated by the DMF 235 according to whether the frequency of the first cross point CP1 is greater than or equal to the first mask index MP1. The controller 250 continuously tunes the analog tuner 205 by a stepsize in each iteration to thereby frequency shift the main component of the spectrum of a signal under test to the working bandwidth of the DMF 235. Without loss of generality, the spectrum under test is therefore shifted into DMF from the right hand side.

In an embodiment, the controller 250 uses the magnitude relation of the first cross point CP1, second cross point CP2 and two boundaries B1, B2 to determine whether the main component of the spectrum of the signal under test is shifted into the working bandwidth of the DMF 235. The controller 250 includes a first counter and a second counter. The first counter is associated with the digital mixer 220. The controller 250 designates a step size. The digital mixer 220 shifts the spectrum of the digital baseband signal based on the step size designated by the controller 250. Namely, the step size is regarded as the spectrum resolution in the invention. The step size can be arranged to be smaller in order to observe the spectrum of a signal in details, even it increases the time required for the entire blind scan. In this case, the step size is set to be 3 MHz. The controller 250 shifts the spectrum of the digital baseband signal based on the step size to thereby produce an offset baseband signal. The digital mixer 220 shifts the spectrum of the digital baseband signal left by one step size. Concurrently, the controller 250 reduces one step size (3 MHz) in both the first mask index MP1 and the first counter. The cited steps are repeated, and the digital mixer 220 continuously shifts the spectrum of the signal left, until the controller 250 decides that the spectrum of the signal is included in the DMF. Next, when the first counter is smaller than or equal to zero, the controller 250 accordingly decides that the section of spectrum is scanned completely. The second counter is associated with the analog tuner 205. The controller 250 assigns 950 MHz to the second counter, and decides that the search range of spectrum is scanned completely when the second counter equals to 2150 MHz.

In another embodiment, the controller 250 decides that the main component of the spectrum of the signal under test is shifted into the working bandwidth of the DMF 235 when the frequency of the second cross point CP2 is smaller than the frequency at the second mask index MP2. The second mask index MP2 is located at the right side of first mask index by one step size. The first mask index MP1 and the second mask index MP2 are used to move a working window. Namely, the first mask index MP1 and the second mask index MP2 are used to define the working window. The controller 250 includes a third counter. The third counter functions as same as the second counter, i.e., determining whether a search range of spectrum (950 MHz to 2150 MHz) is scanned completely.

The controller 250 depends on the coarse carrier frequency offset C_CFO to produce a digital carrier frequency offset D_CFO and arranges the digital mixer 220 to perform a frequency shifting on the digital baseband signal. The spectrum of the digital baseband signal is centralized around DC of the spectrum of DMF 235 according to C_CFO.

The controller 250 produces the down-sampling factor (DSF) based on both the coarse symbol rate C_SR and the bandwidth of the DMF 235. The DSF can be expressed as follows:

$$DSF = \frac{BW_{DMF}}{C\_SR \times \varsigma},$$

where DSF indicates the down-sampling factor, $BW_{DMF}$ indicates a bandwidth of the digital matched filter 235, C_SR indicates the coarse symbol rate, and $\varsigma$ indicates a first tuning factor, for $1 \leq \varsigma$, where $\varsigma$ is determined by the employed window size for moving average and decision threshold for channel detection. When window size is 16 and $\eta$ is 0.3, $\varsigma$ is preferably 1.5. In practice, $BW_{DMF}$ is obtained from sampling rate divided by over-sampling factor.

Figure 5:
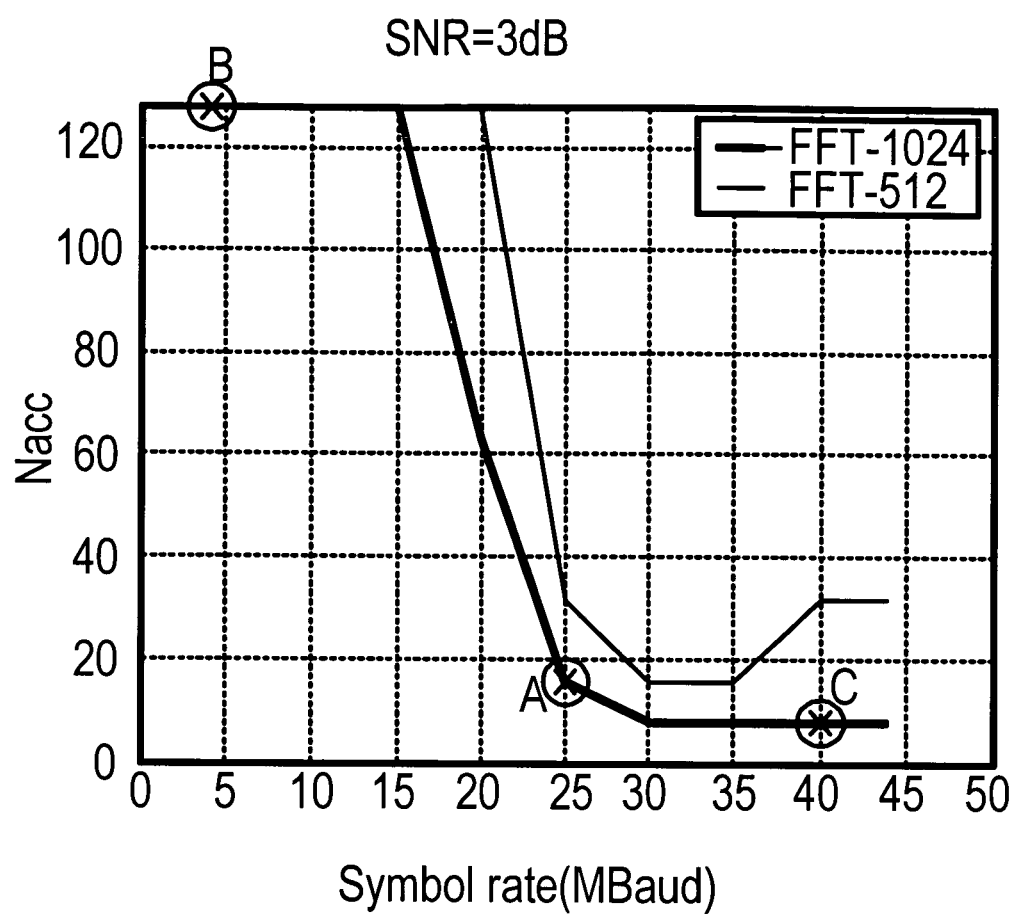
FIG. 5 schematically illustrates the relation between the symbol rate and the number of accumulations of an accumulator.

FIG. 5 shows the relation between the symbol rate and the number of accumulations of the accumulator. In the figure, the relation between the symbol rate and the number of accumulation is a relation between the fine symbol rate and the number of accumulations (Nacc) when the symbol rate has a error rate of $10^{-4}$, SNR=3 dB, and there is no down-sampling operation. The fine symbol rate at A of FIG. 5 indicates a symbol rate of 25 Mbauds, and for a 1024-point FFT, the accumulator 370 necessarily accumulates around 18 or 19 times. The fine symbol rate at B of FIG. 5 indicates a symbol rate of 4 Mbauds, and for the 1024-point FFT, the accumulator 370 cannot achieve symbol rate estimation with error rate lower than $10^{-4}$ simply by a small number of accumulation. As shown in FIG. 5, the prior art is difficult to meet the false rate $10^{-4}$ for the symbol rate smaller than 15 Mbauds. However, due to the interpolator 225, the invention proposes utilizing a down-sampling operation based on the down-sampling factor (DSF) to raise in-band SNR of the digital matched filter 235 and thereby rejecting most adjacent channel interferences. Thus, the estimation of the fine symbol rate and fine carrier frequency is still quite accurate, even at SNR=3 dB by a small number of accumulation.

Figure 6A:
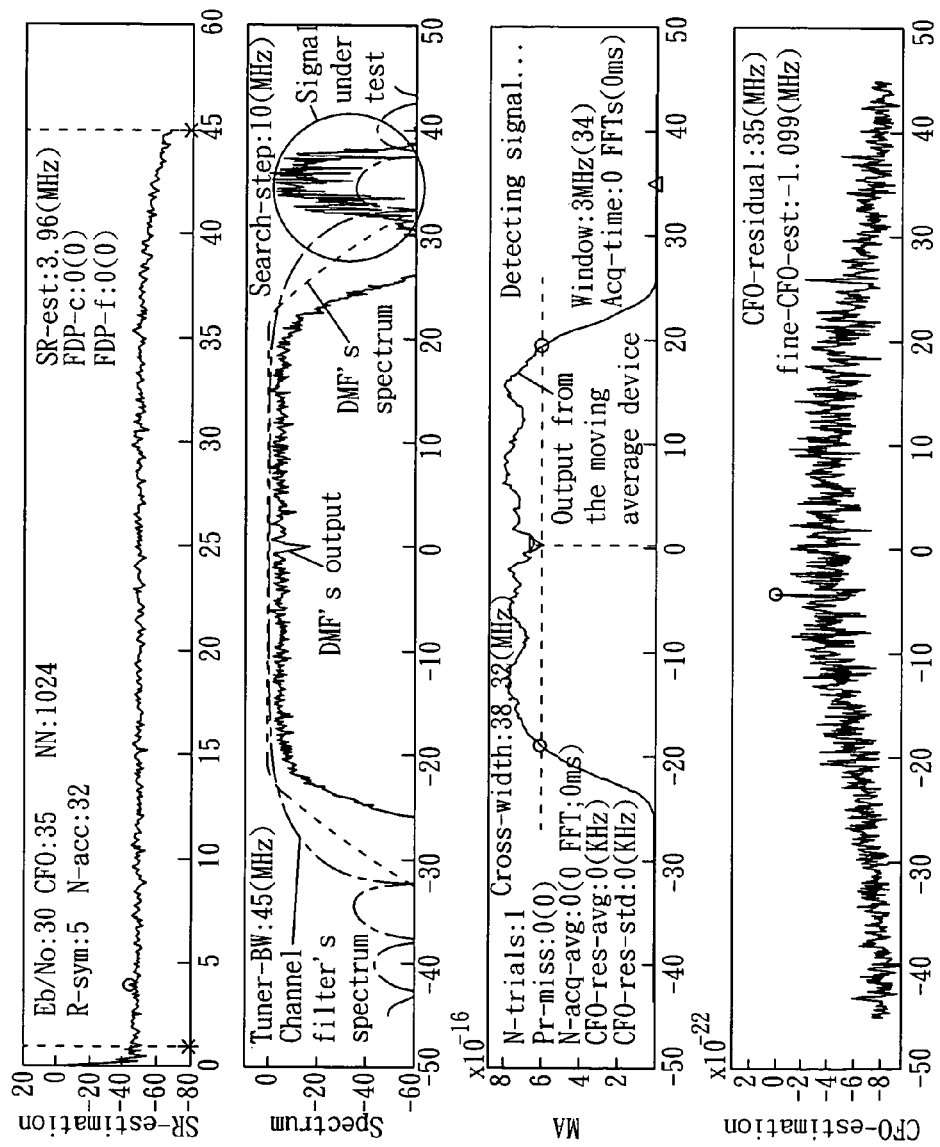
FIGS. 6(A) to 6(G) are schematic graphs of an operation according to an embodiment of the invention.

FIGS. 6(A) to 6(G) are schematic graphs of an operation according to an embodiment of the invention. Initially, the controller 250 assigns zero to the control signal CTRL. In this case, the controller 250 is not based on the digital carrier frequency offset D_CFO to arrange the digital mixer 220, and also not based on the down-sampling factor (DSF) to arrange the interpolator 225. That is, initially, the digital mixer 220 does not perform any frequency shifting on the digital baseband signal, and also the interpolator 225 does not perform a down-sampling. Due to the shifting, as shown in FIG. 6(A), the spectrum of the output signal of the DMF 235 dose not contain the main component of the digital baseband signal. Namely, the output signal of the DMF 235 essentially contains the color noise, and accordingly the output spectrum of the moving average device 410 is a kind of noise spectrum, as shown by the symbol MA of FIG. 6(A).

Figure 6B:
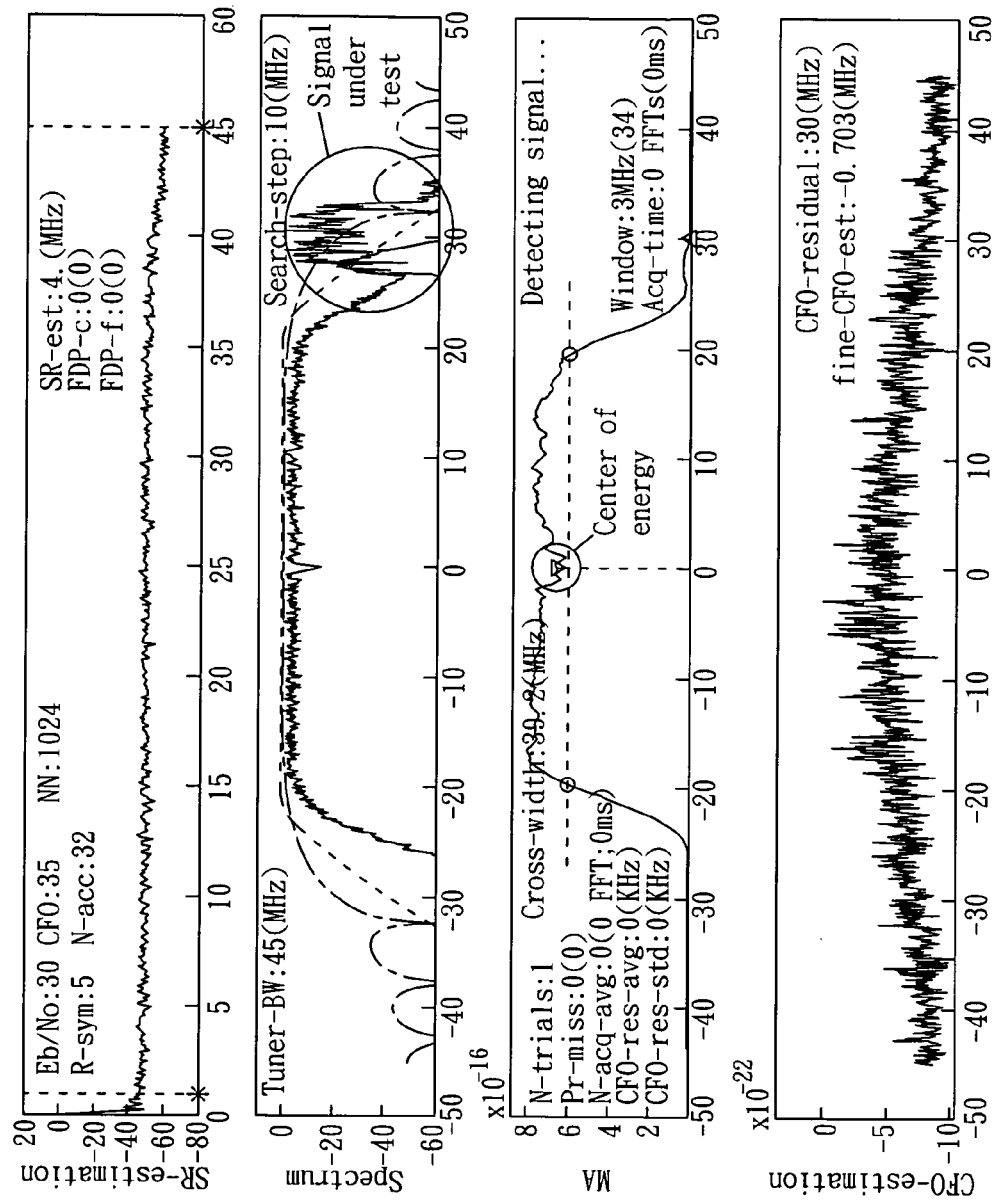

In this case, the signal under test is not located in the operating band of the channel filter of the analog tuner 205, and the digital mixer 220 cannot shift the digital baseband signal to the operating bandwidth of the DMF 235. Therefore, the controller 250 tunes the analog tuner 205 through the I²C bus to fetch a section of RF signal to thereby shift the digital baseband signal to the operating bandwidth of the DMF 235. As shown in FIG. 6(B), only partial spectrum of the digital baseband signal is located in the operating bandwidth of the DMF 235. Accordingly, the position change in the energy center is unobvious. In this case, the spectrum of the signal under test is still not included in the operating band of the channel filter of the analog tuner 205.

Figure 6C:
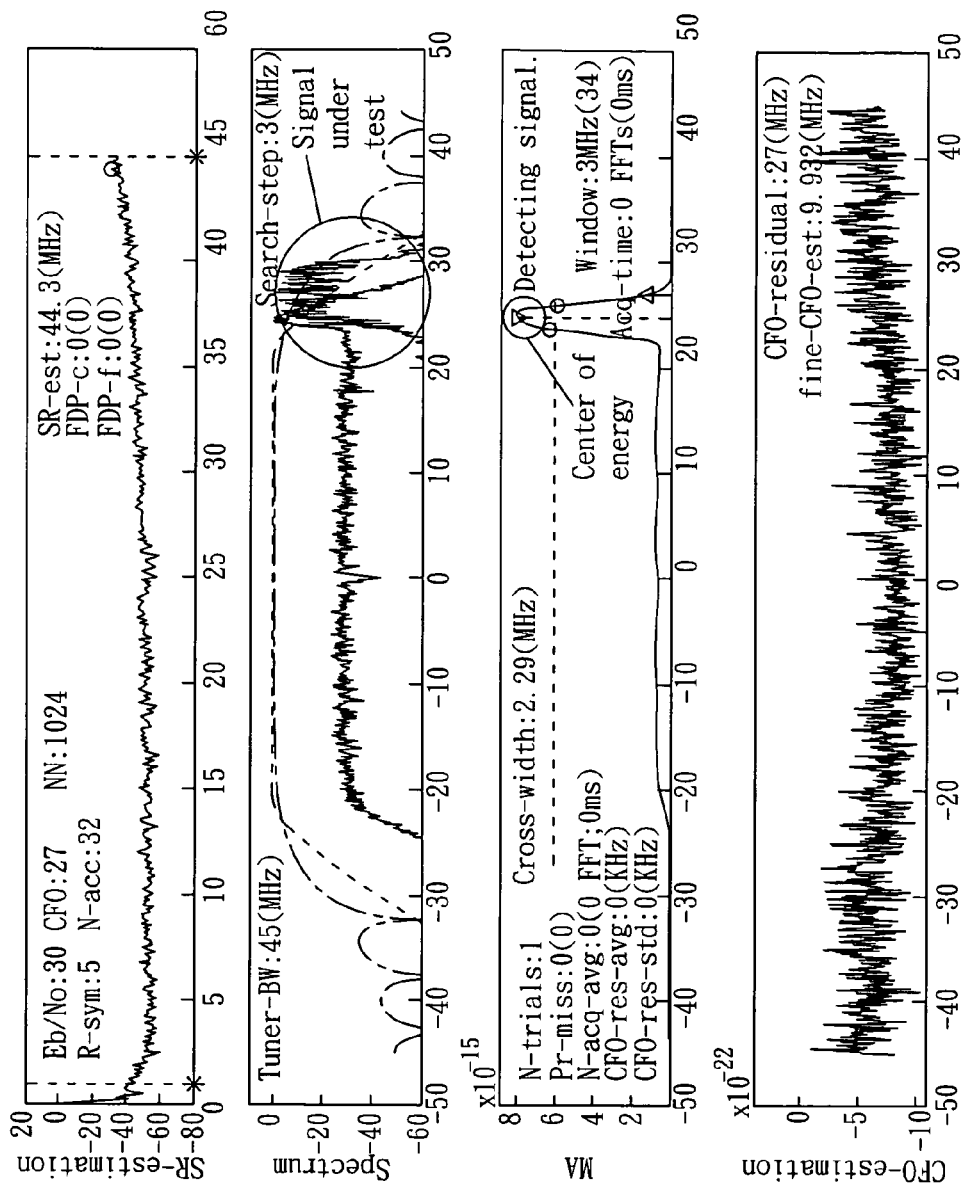

The controller 250 proceeds to tune the analog tuner 205 in order to shift the digital baseband signal to the operating bandwidth of the DMF 235. As shown in FIG. 6(C), most spectrum of the digital baseband signal is located in the operating bandwidth of the DMF 235, so the position change of the energy center is significantly present. The controller 250 determines whether the signal under test is detected based on the position change.

Figure 6D:
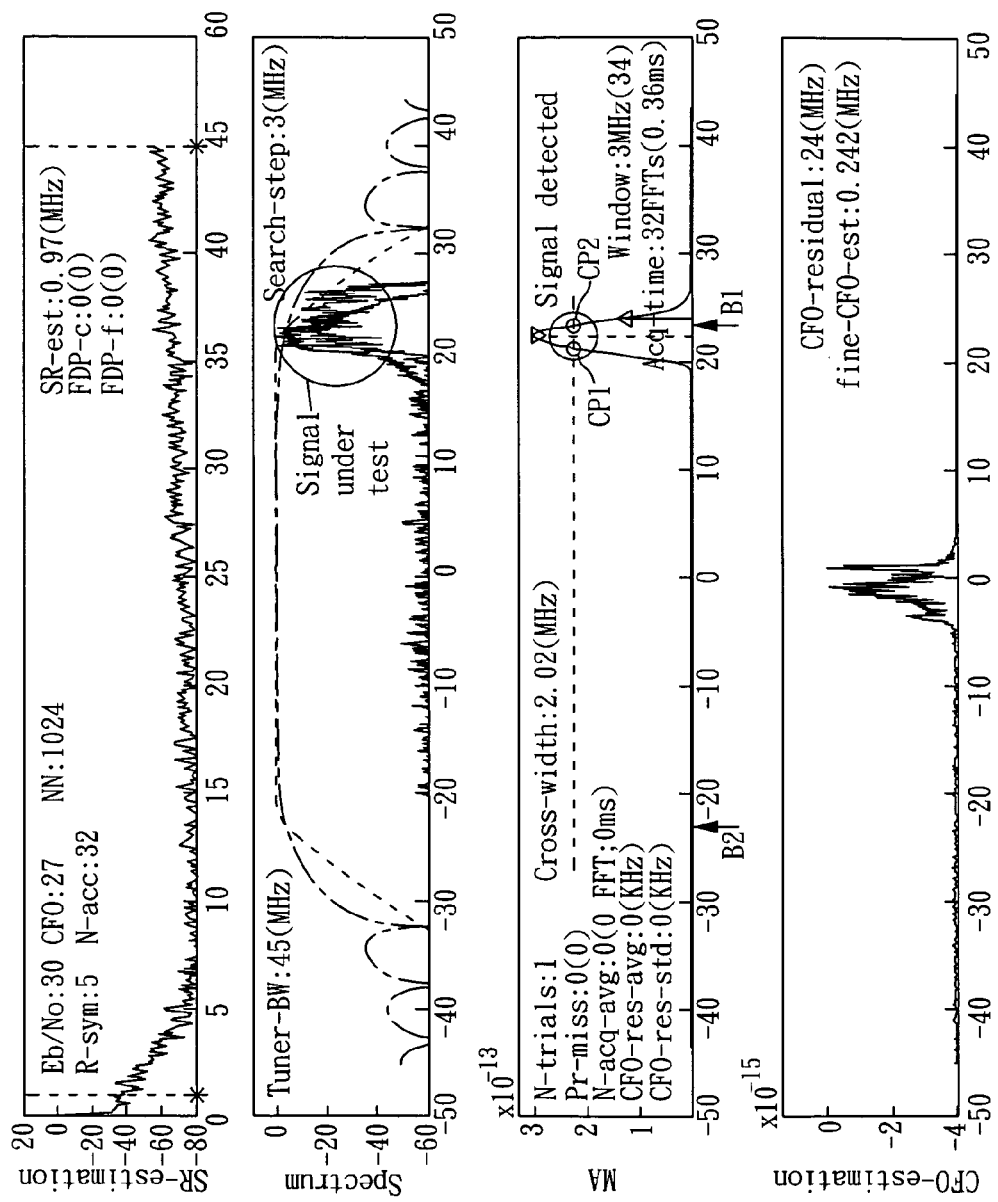

The controller 250 proceeds to tune the analog tuner 205 in order to keep on shifting the digital baseband signal to the operating bandwidth of the DMF 235. As shown in FIG. 6(D), the spectrum of the digital baseband signal is entirely located in the operating bandwidth of the DMF 235. In this case, since the transition band of the DMF 235 has no 90-degree gradient, two boundaries B1, B2 are employed to assist channel detection according to the passband of the DMF 235. The boundary B2 is located at the left side of the operating bandwidth BW of the DMF 235, and the boundary B1 is located at the right side. The size relationship between the cross points CP1, CP2 and the boundaries B1, B2 can be used to detect whether the main component of the spectrum of the signal under test is shifted into the operating bandwidth of the DMF 235.

Figure 6E:
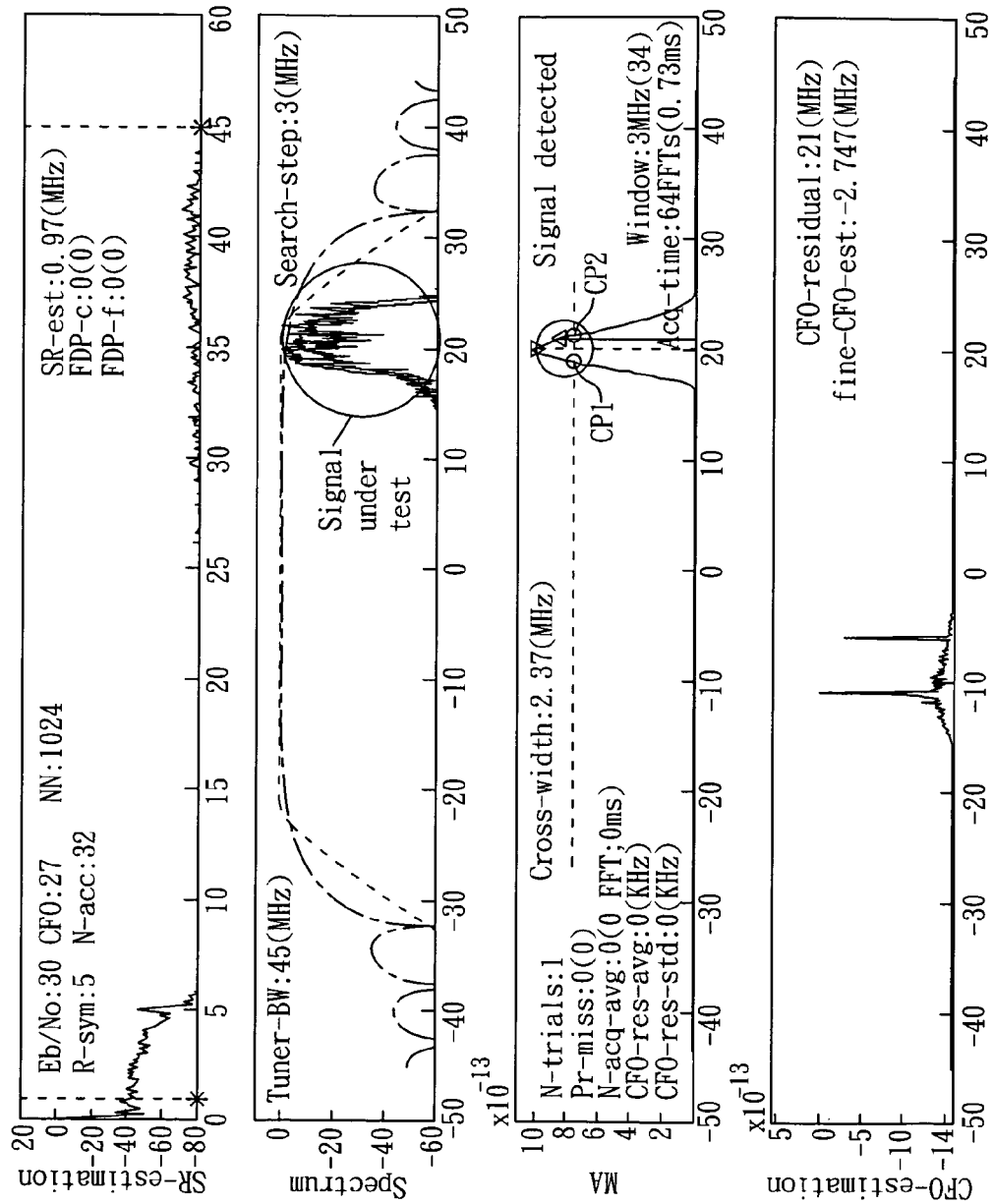

The controller 250 proceeds to tune the analog tuner 205 in order to keep on shifting the digital baseband signal to the operating bandwidth of the DMF 235. As shown in FIG. 6(E), when the first cross point CP1 generated by the cross point search device 415 is smaller than or equal to the boundary B2, or the second cross point CP2 is smaller than or equal to the boundary B1, the controller 250 decides that the spectrum of the digital baseband signal is entirely located in the operating bandwidth of the DMF 235 and not influenced by the transcient band of the DMF 235. In addition, when the frequency of the second cross point CP2 generated by the cross point search device 415 is smaller than or equal to the frequency at the second mask index MP2, the controller 250 accordingly decides that the spectrum of the digital baseband signal is completely located in the working bandwidth of the DMF 235 and not influenced by the transcient band of the DMF 235. In this case, the second mask index MP2 is located at the right side of the first mask index MP1 by one step size.

Since the spectrum of the digital baseband signal is entirely located in the operating bandwidth of the DMF 235, there is no need to tune the analog tuner 205, i.e., no analog frequency shifting is required before the followed parameter estimation procedure is completed.

The controller 250 sets the control signal to one, and controls the spectrum computation device 240 and the spectrum parameter extractor 245 to calculate the first cross point CP1, the second cross point CP2, the coarse carrier frequency offset C_CFO, and the coarse symbol rate C_SR.

Figure 6F:
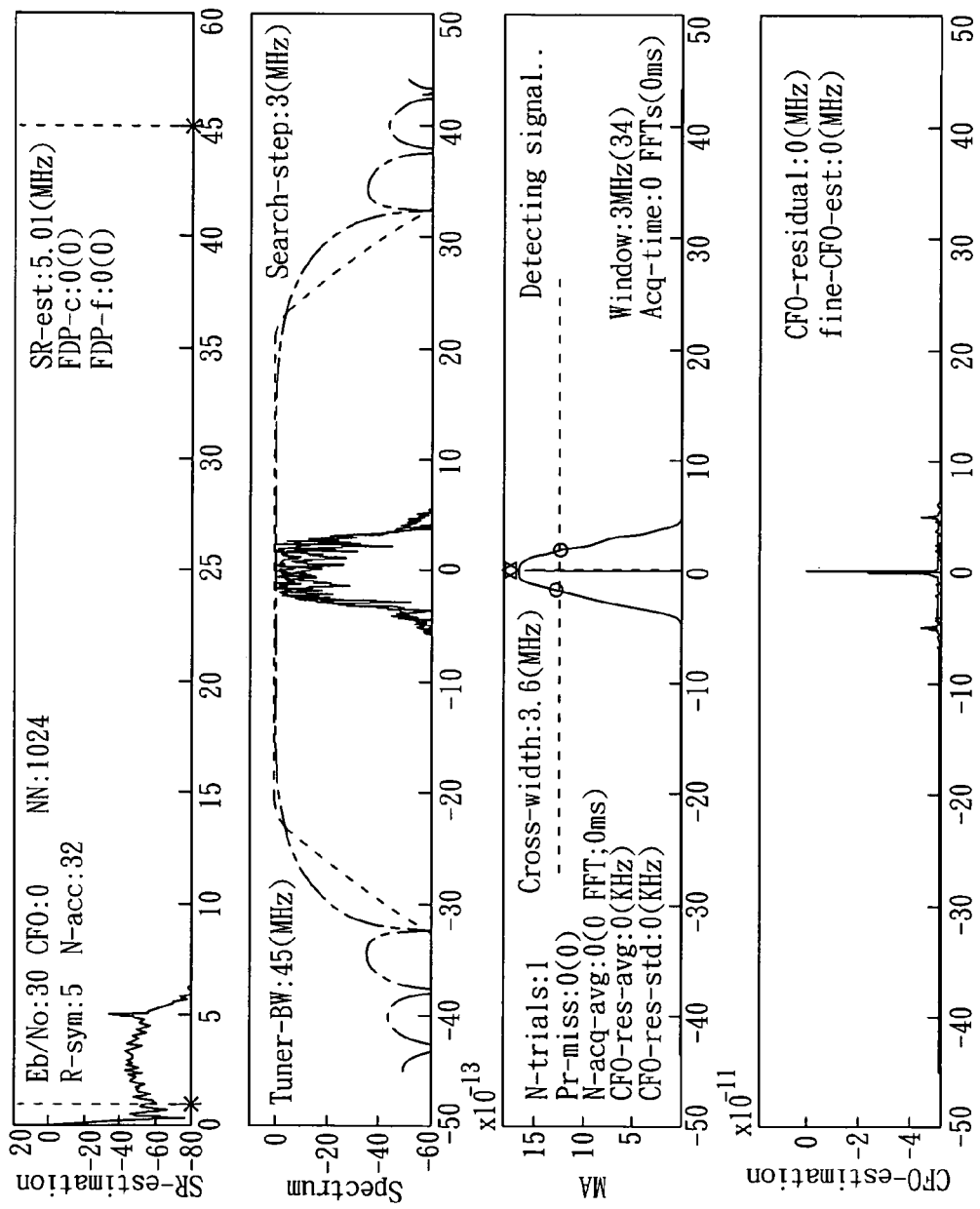

The controller 250 depends on the coarse carrier frequency offset C_CFO generated by the spectrum parameter extractor 245 to calculate and produce the digital carrier frequency offset D_CFO and to arrange the digital mixer 220 for performing the frequency shifting on the digital baseband signal. As shown in FIG. 6(F), the controller 250 is based on C_CFO to shift the center frequency of the spectrum of the digital baseband signal to a position around the DC part of the digital signal, i.e., at the DC part of the signal of the DMF 235.

Figure 6G:
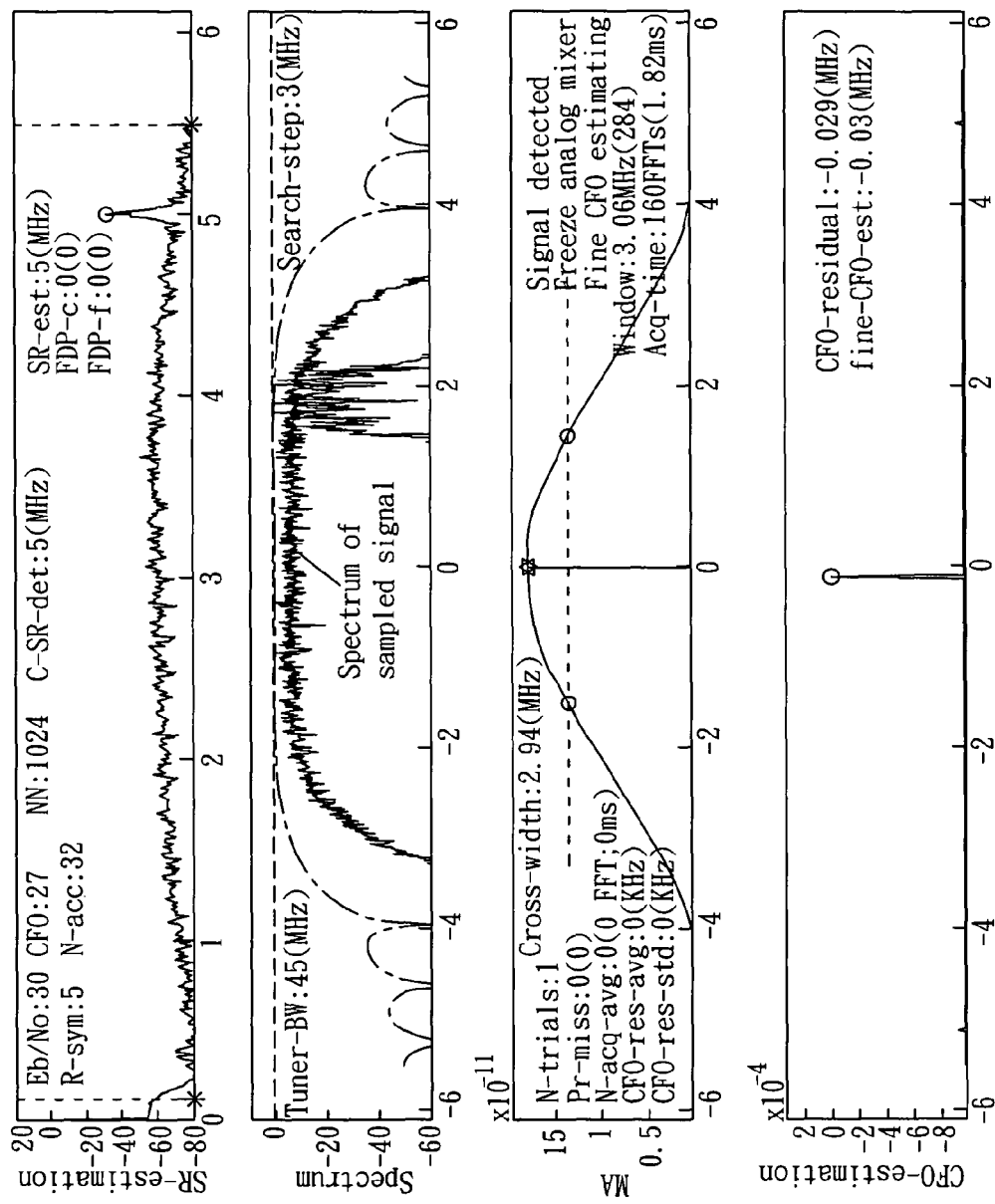

The controller 250 depends on the coarse symbol rate C_SR generated by the spectrum parameter extractor 245 to calculate and produce the down-sampling factor (DSF). The interpolator 225 performs the down-sampling operation based on the DSF. As shown in FIG. 6(G), such a way can raise the in-band signal to noise ratio (SNR) in the DMF 235 and reject possible adjacent channel interference to assist the following F_CFO and F_SR estimation.

Next, the controller 250 assigns two to the control signal CTRL for estimating the fine carrier frequency offset F_CFO or three for estimating the fine symbol rate F_SR. In this case, as shown in FIG. 6(G), the subplots "SR-estimation" and "CFO-estimation" depict the desired estimates at the positions of the peaks, respectively.

In the prior art, the spectrum of the digital baseband signal occupies only a part of the operating bandwidth of the digital matched filter 235 and the remainder is occupied by noise and possible adjacent channel interference. Accordingly, the DMF 235 has a very small in-band SNR leading to high error or false estimation rate in the followed estimation processes. In contrary in the invention, the spectrum of the digital baseband signal occupies a large portion of operating bandwidth of the DMF 235; the digital baseband signal becomes the main component of the output signal of the DMF 235, and the noise only occupy a little. Thus, the in-band SNR is raised to thereby improve the accuracy of the fine carrier frequency offset F_CFO and fine symbol rate F_SR in estimation.

Due to the spectrum symmetry, in the prior art, the spectrum of a signal is typically shifted to the position around DC of the operating bandwidth of the DMF 235. Namely, when the spectrum of the signal is located in the working bandwidth of the DMF 235, the prior art needs to continuously tune the analog tuner 205 to thereby shift the spectrum of the signal to the position at the DC part of an operating bandwidth of the DMF 235. However, such a spectrum shifting is not required in the invention because the digital mixer 220 can shift the spectrum of the signal to the position at the DC part of an operating bandwidth of the DMF 235 when the spectrum of the signal enters in the DMF 235. Namely, the invention uses a digital signal processing technique to complete the function of the analog mixer, and the operating speed is much faster than only tuning the analog tuner. Therefore, the time required for channel parameter estimation is effectively reduced.

Figure 7:
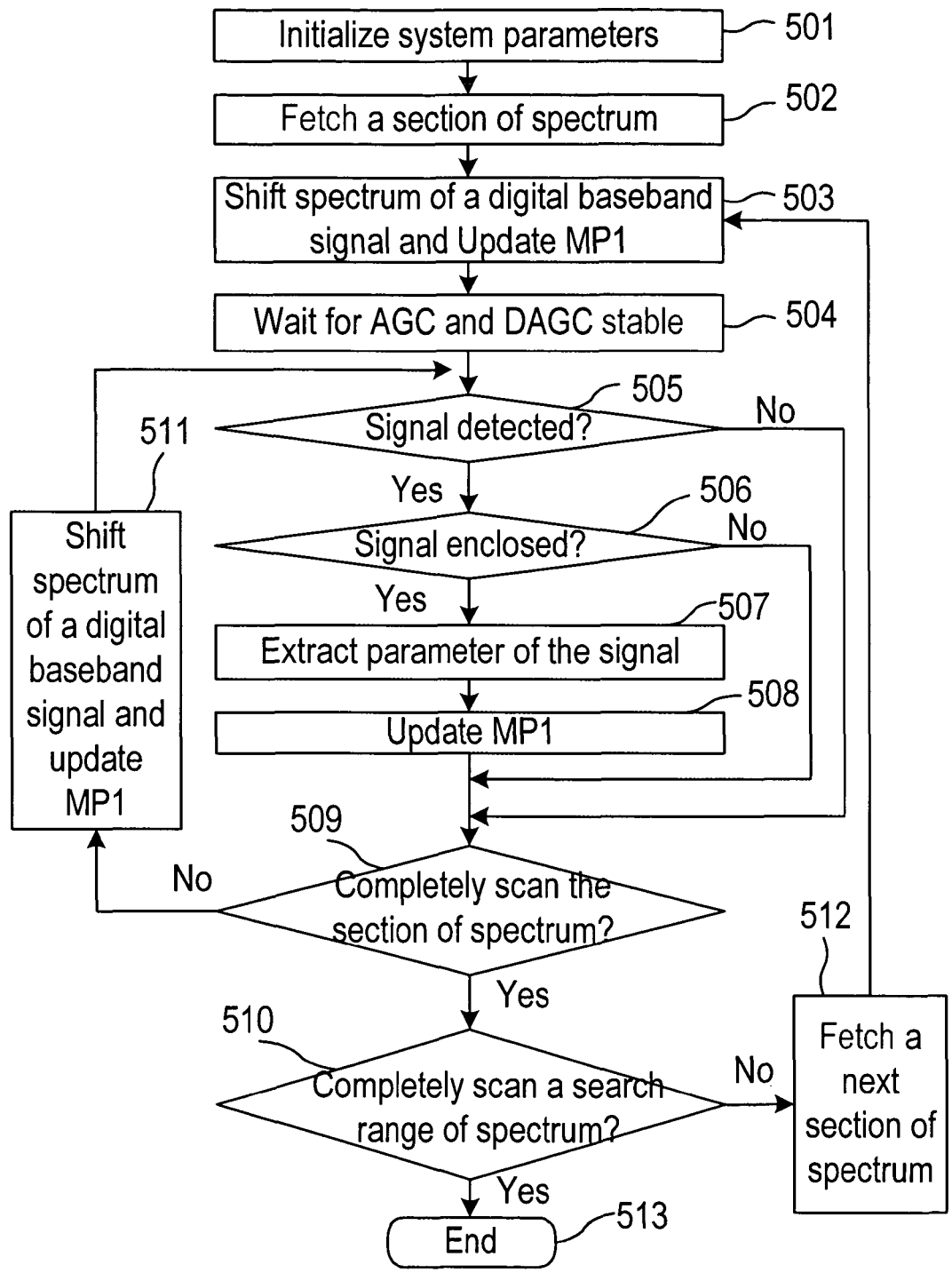
FIG. 7 is a flowchart of a blind scan procedure in a DVB-S system according to an embodiment of the invention.

FIG. 7 is a flowchart of a blind scan procedure for a DVB-S system according to an embodiment of the invention. The method is applied to the DVB-S system to detect a signal under test in a search range of spectrum (in this case, 950 to 2150 MHz) of a DVB-S system channel.

As shown in FIG. 7, step S501 initializes system parameters.

In step S502, the analog tuner 205 is employed to fetch a section of spectrum. The controller 250 tunes an analog carrier frequency A-CFO of the analog tuner and fetches a section of spectrum from a search range of spectrum of a system channel. The controller 250 also locates the spectrum of a signal under test to the working spectrum of the channel filter of the analog tuner 205. For example, the controller 250 can tune the median frequency of the analog tuner 205 to 950 MHz, and the ADC 210 produces a digital baseband signal based on the analog baseband signal generated by the analog tuner 205.

In step S503, the controller 250 depends on a first mask index MP1 to arrange the digital mixer 220 for performing a frequency shifting on the digital baseband signal. Thus, the spectrum of the digital baseband signal is shifted to thereby produce an offset baseband signal and update the first mask index MP1.

Step 504 waits for the tuner AGC and the DAGC to be stable.

In step S505, the controller 250 determines whether a signal is detected in the spectrum generated by the DMF 235. Step S506 determines whether the spectrum of the signal detected is contained in the DMF 235 when step S505 decides that the signal is detected. On the other hand, when step S505 decides that the signal is not detected, step S509 is executed. When a first cross point CP1 is greater than or equal to the first mask index MP1, it is decided that the signal is detected in the spectrum generated by the DMF 235, and otherwise no signal is detected.

Step S507 extracts the parameters of the signal when step S506 decides that the spectrum of the signal is contained in the DMF 235. Step S508 updates the first mask index MP1. When a first cross point CP1 touches a second boundary B2, or a second cross point CP2 touches a first boundary B1, it is decided that the spectrum of the signal is contained in the DMF 235. When the frequency of the first cross point CP1 is smaller than or equal to the second boundary B2, it indicates that the first cross point CP1 touches the second boundary B2. When the frequency of the second cross point CP2 is smaller than or equal to the first boundary B1, it indicates that the second cross point CP2 touches the first boundary B1. When step S506 decides that the spectrum of the signal is not contained in the DMF 235, step S509 is executed.

Step S509 determines whether the section of spectrum is completely scanned. Step S510 determines whether a search range of spectrum (for example, 950 to 2150 MHz) is completely scanned when step S509 decides that the section of spectrum is completely scanned. When step S509 decides that the section of spectrum is not scanned completely, step S511 arranges the digital mixer to perform a frequency shifting on the digital baseband signal and updates the first mask index MP1 followed by executing S505.

Step 513 ends the process when step S510 decides that the search range of spectrum (950 to 2150 MHz) is completely scanned, and otherwise step S512 tunes the analog tuner 205 to fetch a next section followed by executing step S503.

FIGS. 8 to 11 are schematic diagrams of an operation of the blind scan procedure in a DVB-S system according to a first embodiment of the invention.

Step S501 initializes system parameters. The controller 250 tunes a median frequency of the analog tuner 205 through the I$^2$C bus to thereby fetch a signal in a certain section of spectrum. In this case, the median frequency of the analog tuner 205 is tuned to 950 MHz. The controller 250 arranges two boundaries B1, B2. The distance between the boundaries B1 and B2 is around the width of the passband of the DMF 235. The second boundary B2 is located at the left side of the working (operating) bandwidth BW of the DMF 235, and the first boundary B1 is located at the right side. The controller 250 arranges a first mask index MP1 and a second mask index MP2. The controller 250 locates the first mask index MP1 at a position where a half of the bandwidth BW is subtracted from the DC part of the DMF 235. For example, if the working bandwidth BW of the DMF 235 is 45 MHz, the first mask index MP1 is located at −22.5 MHz. The second mask index MP2 is located at the same frequency as the first boundary B1.

The controller 250 configures a first counter and a second counter. The first counter is associated with the digital mixer 220. When the first counter is smaller than or equal to zero, it indicates that the section of spectrum is scanned completely. The second counter is associated with the analog tuner 250. The controller 250 initially assigns 950 MHz to the second counter. When the second counter is greater than or equal to 2150 MHz, the controller 250 decides that the whole search range of underlying spectrum corresponding to the system channel is scanned completely. The controller 250 arranges a step size, and the digital mixer 220 shifts the spectrum of the digital baseband signal based on the step size. Namely, the step size is regarded as the spectrum resolution in the invention. The step size can be arranged to be smaller in order to observe the spectrum of a signal in details, even it also increases the time required for the entire blind scan. In this case, the step size is assigned 3 MHz.

Figure 8:
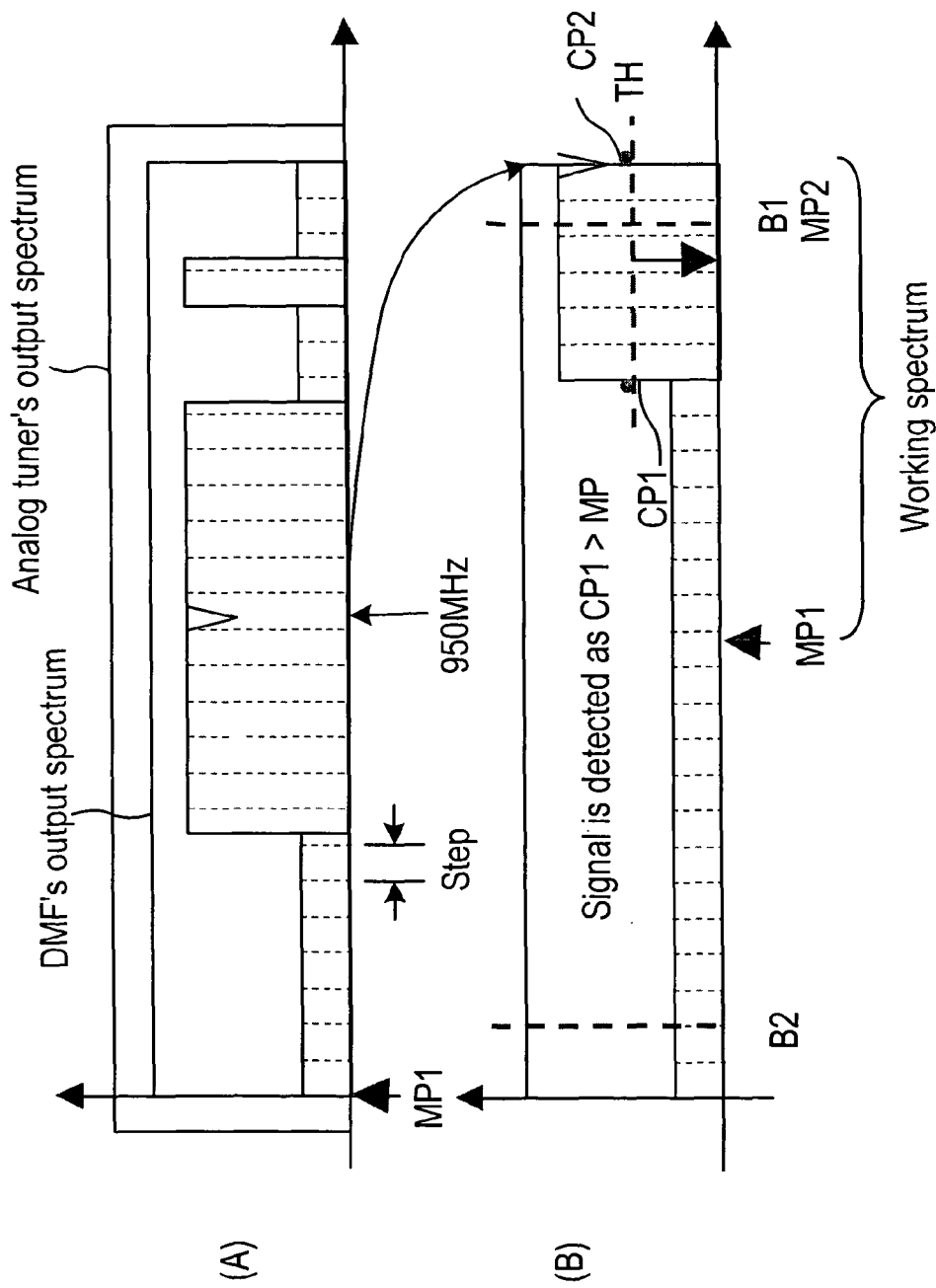

In step S502, the analog tuner 205 is employed to fetch a section of spectrum. The controller 250 tunes the median frequency of the analog tuner 205 to 950 MHz. The ADC 210 produces a digital baseband signal based on the analog baseband signal generated by the analog tuner 205. FIG. 8 is a schematic diagram of fetching a section of spectrum in step S502. As shown at (A) of FIG. 8, which is a schematic diagram of a spectrum generated by the DMF 235, the first mask index MP1 is located at the left side (at −22.5 MHz) of the working bandwidth of the DMF 235.

In step S503, the controller 250 depends on the first mask index MP1 to shift the spectrum of the digital baseband signal to thereby produce an offset baseband signal. As shown at (B) of FIG. 8, the digital mixer 220 shifts the spectrum of the digital baseband signal right to thereby locate the first mask index MP1 at the DC part of the working bandwidth of the DMF 235. Concurrently, the first counter associated with the digital mixer 220 is set to be 22.5 MHz.

Step S504 waits for the tuner AGC 215 and the DAGC 230 to be stable.

In step S505, the controller 250 determines whether a signal is detected in the spectrum generated by the DMF 235. Namely, when the frequency of the first cross point CP1 is greater than or equal to the frequency at the first mask index MP1, it indicates that the signal is detected.

The range from the first mask index MP1 to the right side of the working bandwidth of the DMF 235 is defined as the working spectrum. The first cross point CP1 is defined as the first position where the amplitude in the working spectrum is over a threshold at first time, and the second cross point CP2 is defined as the first position where the amplitude in the working spectrum (greater than CP1) is below the threshold at first time. The threshold TH is set according to the following formula:

$$TH = (Max - Min) \times \eta + Min,$$

where Max indicates an amplitude maximum of the working spectrum between the mask indexes MP1 and MP2, Min indicates an amplitude minimum of the working spectrum between the mask indexes MP1 and MP2, and η indicates a second tuning factor, for 0≤η≤1 and η is preferably 0.3. In this case, the second mask index MP2 and the first boundary B1 have the same frequency.

As shown at (B) of FIG. 8, in step S505, the controller 250 decides that there is signal detected in the spectrum generated by the DMF 235. Therefore, the controller 250 in step S506 determines whether the spectrum of the signal is contained in the DMF 235.

For a broadband signal, since the entire bandwidth can be greater than the working bandwidth of the DMF 235, it is decided that the spectrum of the signal is contained in the DMF 235 when the first cross point CP1 touches a second boundary B2. Conversely, the entire bandwidth of a narrowband signal may occupy only a part of the working bandwidth of the DMF 235, and in this case it is decided that the spectrum of the signal is contained in the DMF 235 when the second cross point CP2 touches a first boundary B1.

When the frequency of the first cross point CP1 is smaller than or equal to the second boundary B2, it indicates that the first cross point CP1 touches the second boundary B2. When the frequency of the second cross point CP2 is smaller than or equal to the first boundary B1, it indicates that the second cross point CP2 touches the first boundary B1.

As shown at (B) of FIG. 8, when the controller 250 in step S506 decides that the spectrum of the signal is not included in the DMF 235, step S509 is executed.

Step S509 determines whether the section of spectrum is completely scanned. Since the first counter equals to 22.5 MHz, it indicates the section of spectrum is not scanned completely, so step S511 is executed.

In step S511, the controller 250 depends on the step size to shift the spectrum of the digital baseband signal to thereby produce an offset baseband signal. As shown at (A) of FIG. 9, the digital mixer 220 shifts the spectrum of the digital baseband signal left by one step size, and the controller 250 reduces one step size (3 MHz) in the first mask index MP1 and the first counter respectively. The steps are repeated, so the digital mixer 220 continuously shifts the spectrum of the digital baseband signal left, until the controller 250 in step S506 decides that the spectrum of the signal is included in the DMF 235.

Figure 9:
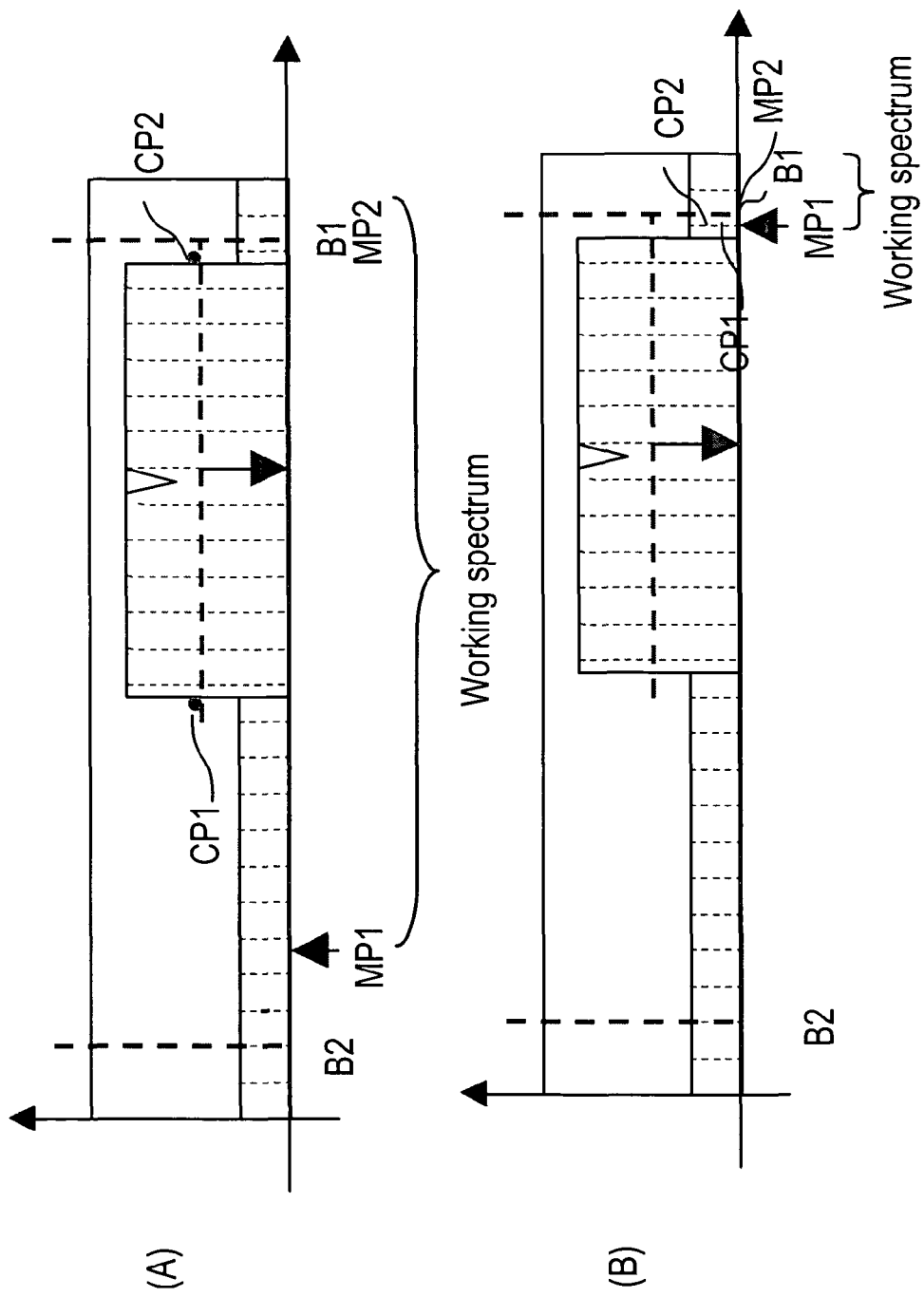

As shown at (A) of FIG. 9, when the frequency of the second cross point CP2 is smaller than or equal to the first boundary B1, the controller 250 in step S506 decides that the spectrum of the signal detected is included in the DMF 235, and step S507 is executed to extract the parameters of the signal. The controller 250 in step S508 updates the first mask index MP1. The controller 250 puts the first mask index MP1 behind the second cross point CP2 in this iteration. Namely, as shown at (B) of FIG. 9, the controller 250 arranges the first mask index MP1 to have a frequency greater than the second cross point CP2.

To detect the parameters of the signal detected in step S507, the spectrum parameter extractor 245 first calculates the coarse carrier frequency offset C_CFO and the coarse symbol rate C_SR. The digital mixer compensates C_CFO and shifts the spectrum of the signal to around DC part of the working spectrum of the DMF 235. Next, the interpolator 225 enlarges the spectrum of the signal according to DSF calculated by C_SR to thereby make the spectrum of the signal fill up the working spectrum of the DMF 235. Accordingly, as in-band SNR is improved and possible ACI is rejected, much more accurate fine carrier frequency offset F_CFO and fine symbol rate F_SR can be obtained. The controller 250 is based on the coarse symbol rate C_SR and the bandwidth of the DMF 235 to produce the down-sampling factor (DSF). The DSF can be expressed as follows:

$$DSF = \frac{BW_{DMF}}{C\_SR \times \varsigma},$$

where DSF indicates the down-sampling factor, $BW_{DMF}$ indicates a bandwidth of the digital matched filter 235, C_SR indicates the coarse symbol rate, and ζ indicates a first tuning factor, for 1≤ζ, where ζ is determined by the window size used by the average device 410 and decision threshold. When the window size is 16 and η is 0.3, ζ is preferably 1.5.

Since the threshold TH, the amplitude maximum Max, the amplitude minimum Min are defined in the working spectrum, only noises or adjacent channel interferences are shown in the working spectrum, and thus the first cross point CP1 and the second cross point CP2 are located at the first mask index MP1.

Since the first counter in step S509 still contains a positive number, the controller 250 decides that the section of spectrum is not scanned completely, and step S511 is executed.

In step S511, the controller 250 arranges the digital mixer 220 to perform a frequency shifting on the digital baseband signal and to update the first mask index MP1. As shown at (A) of FIG. 10, when the digital mixer 220 shifts the spectrum of the digital baseband signal left by one step size, the controller 250 reduces one step size (3 MHz) in the first mask index MP1 and the first counter. Again, the process returns to step S505 to determine whether a signal is detected in the spectrum generated by the DMF 235 or not, and the cited steps are repeated.

Figure 10:
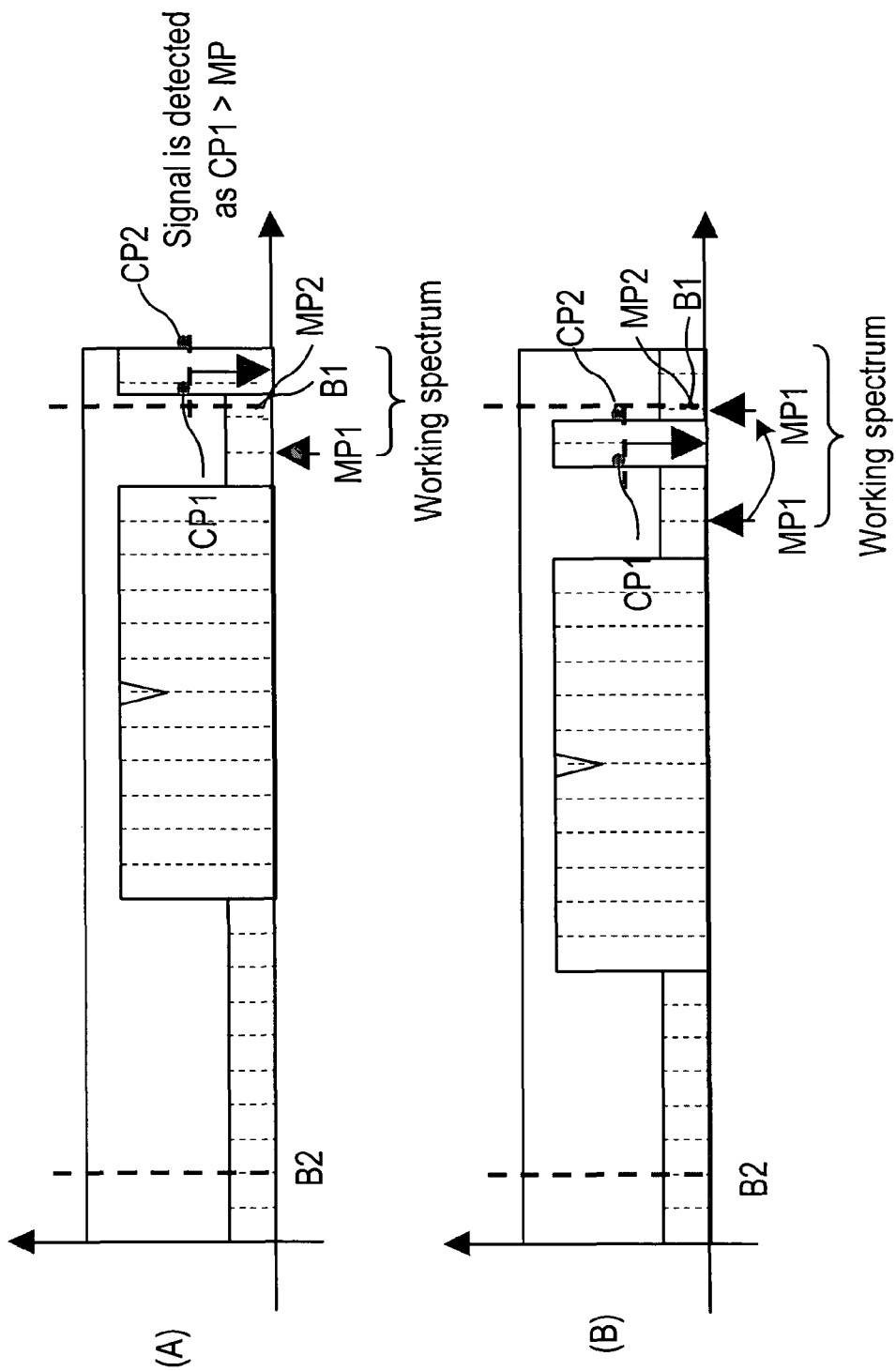

As shown at (B) of FIG. 10, when the second cross point CP2 touches the first boundary B1, it indicates that the spectrum of the signal is included in the DMF 235, and step S507 extracts the parameters of the signal. The first mask index MP1 is updated in step S508.

Figure 11:
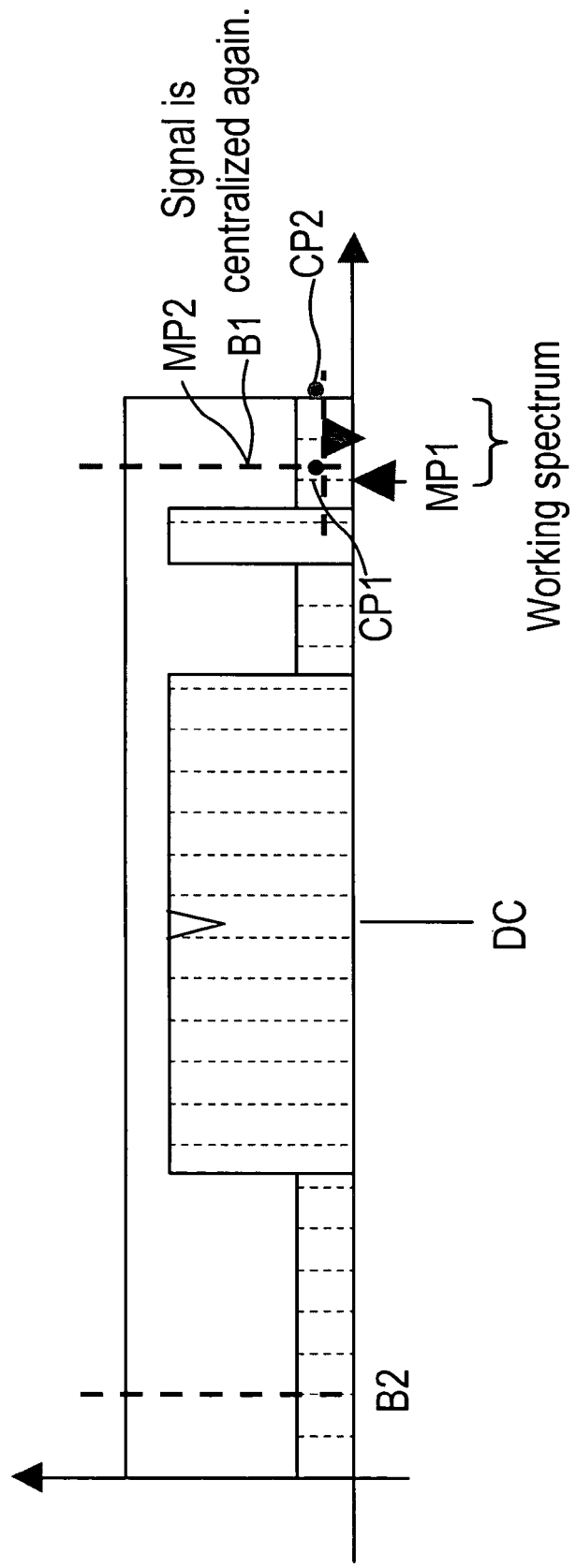

As shown in FIG. 11, the digital mixer 220 proceeds to shift the spectrum of the digital baseband signal left by one step size. When the first counter contains a value smaller than or equal to zero, the controller 250 in step S509 decides that the section of spectrum is completely scanned, and step S510 is executed. The controller 250 in step S510 decides that the search range (950 to 2150 MHz) is not scanned completely when the second counter contains a value not equal to 2150 MHz, and step S512 is executed to tune the analog tuner 205 to fetch a next section of spectrum. Next, step S503 is executed again. When step S510 decides that the search range of spectrum is scanned completely, step S513 is executed to end the process.

Since the spectrum at the left side of the first mask index MP1 is scanned, the controller 250 depends on the bandwidth of the channel filter of the analog tuner 205, the sampling rate of the ADC 210, and the bandwidth of the DMF 235 to calculate and tune the carrier frequency of the analog tuner 205 to thereby arrange a signal within a certain section of spectrum fetched by the analog tuner 205 in step S502 so as to include the working spectrum not scanned for further scanning. In addition, in step S510, the carrier frequency is used to arrange the second counter to thereby determine whether the search range is completely scanned. Namely, when the second counter contains a value greater than or equal to 2150 MHz, the controller 250 decides that the search range is completely scanned.

In this embodiment, the spectrum is scanned from low to high frequency. However, the scanning scheme can be easily changed into a high to low frequency scan by those skilled in the art.

The controller 250 can adjust the step size, i.e., the scan resolution, when the speed of the blind scan is compromised. In addition, since the fine carrier frequency offset calculator is provided, the resolution is not limited by the analog tuner 205, so as to overcome the problems in the prior art.

Figure 12:
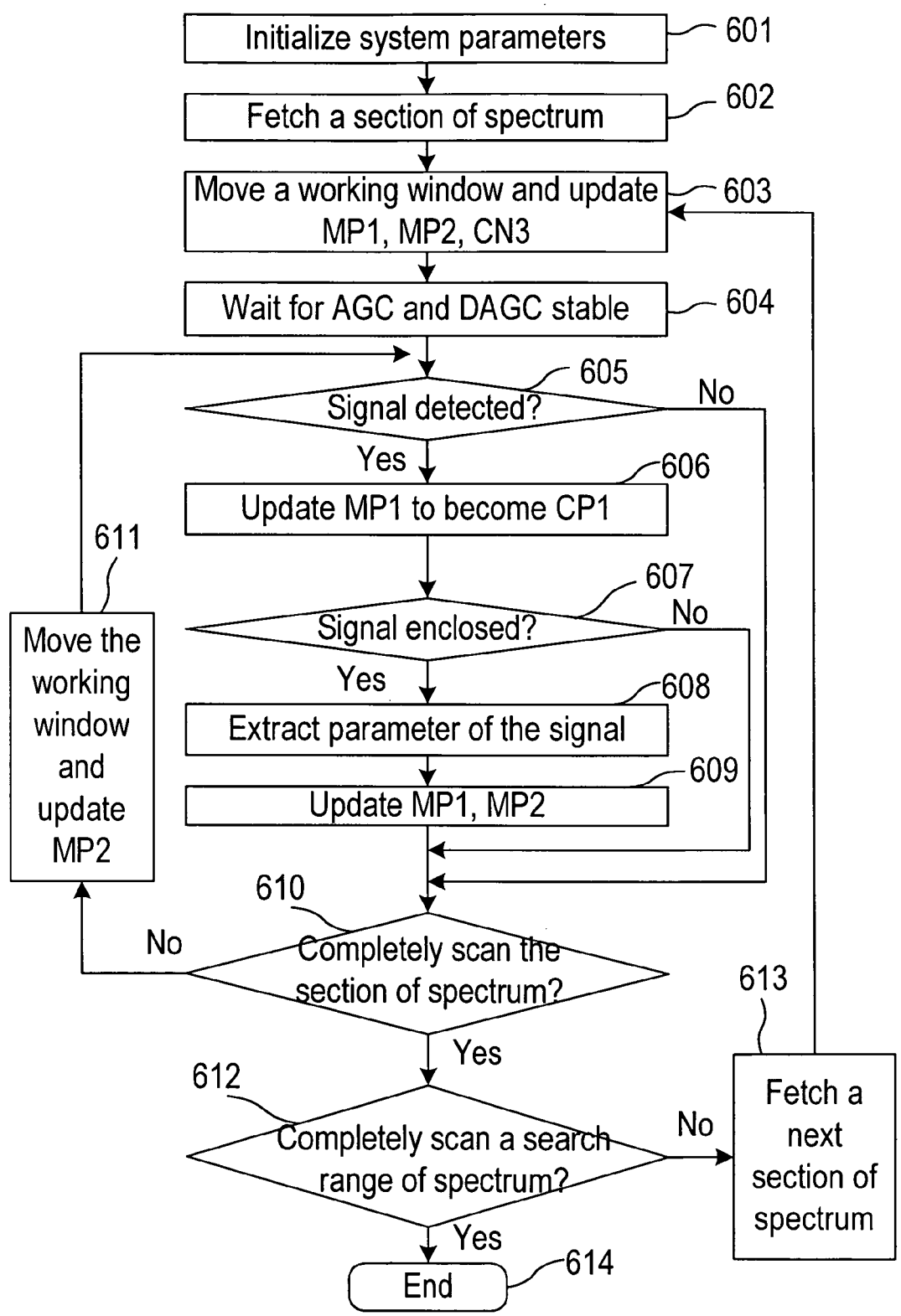
FIG. 12 is a flowchart of a blind scan procedure in a DVB-S system according to another embodiment of the invention.

FIG. 12 is a flowchart of a blind scan procedure for a DVB-S system according to a second embodiment of the invention. The method is applied to the DVB-S system to detect (scan) all signals within a search range of underlying spectrum (950 to 2150 MHz).

As shown in FIG. 12, step S601 initializes system parameters.

In step S602, the analog tuner 205 is employed to fetch a section of spectrum. The controller 250 tunes an analog carrier frequency (A_CF) of the analog tuner 205 to thereby produce a digital baseband signal. At the first-time operation, the controller 250 tunes the median frequency of the analog tuner 205 to 950 MHz to thereby produce the digital baseband signal.

In step S603, the controller 250 arranges a first mask index MP1 and a second mask index MP2 in order to move a working window. Namely, the working window is defined by the indexes MP1 and MP2. The controller 250 arranges a third counter to function as same as the second counter to thereby determine whether a search range of spectrum, i.e., 950 to 2150 MHz, is completely scanned.

Step S604 waits for the tuner AGC 215 and the DAGC 230 to be stable.

In step S605, the controller 250 determines whether a signal is detected in the spectrum generated by the DMF 235. The controller 250 in step S606 updates the first mask index MP1 (step S230) when step S605 decides that the signal is detected. The controller 250 in step S607 determines whether the spectrum of the signal is contained in the DMF 235. When step S605 decides that the signal is not detected, step S610 is executed.

Step S608 extracts the parameters of the signal when step S607 decides that the spectrum of the signal is contained in the DMF 235. Step 609 updates the first mask index MP1 and the second mask index MP2. When step S607 decides that the spectrum of the signal is not contained in the DMF 235, step S610 is executed.

To detect the parameters of the signal in step S608, the spectrum parameter extractor 245 first calculates the coarse carrier frequency offset C_CFO and the coarse symbol rate C_SR, and the digital mixer 220 compensates the spectrum of the signal by C_CFO to centralize around DC of the working spectrum of the DMF 235. Next, the interpolator 225 enlarges the spectrum of the signal to thereby obtain the more accurate fine carrier frequency offset F_CFO and fine symbol rate F_SR. The controller 250 produces the down-sampling factor (DSF) based on the coarse symbol rate C_SR and the bandwidth of the DMF 235. The DSF can be expressed as follows:

$$DSF = \frac{BW_{DMF}}{C\_SR \times \varsigma},$$

where DSF indicates the down-sampling factor, $BW_{DMF}$ indicates a bandwidth of the digital matched filter 235, C_SR indicates the coarse symbol rate, and $\varsigma$ indicates a first tuning factor, for $1 \leq \varsigma$, where $\varsigma$ is determined by a used window size and decision threshold. When the used window size is 16 and $\eta$ is 0.3, $\varsigma$ is preferably 1.5.

Step S610 determines whether the section of spectrum is completely scanned. Step S612 determines whether a search range of spectrum (950 to 2150 MHz) is completely scanned when step S610 decides that the section of spectrum is completely scanned. When step S610 decides that the section of spectrum is not scanned completely, the controller 250 in step S611 updates a second mask index MP2 in order to move the working window, and step S605 is executed again.

Step S614 ends the process when step S612 decides that the search range of spectrum (950 to 2150 MHz) is completely scanned, and otherwise step S613 is executed to tune the analog tuner 205 for fetching a next section. Next, step S603 is executed.

FIGS. 13 to 16 are schematic diagrams of an operation of FIG. 12 according to a second embodiment of the invention.

In step S601, the controller 250 tunes a median frequency of the analog tuner 205 through the I²C bus to thereby fetch a signal in a certain section of spectrum. In this case, the median frequency of the analog tuner 205 is tuned to 950 MHz. The controller 250 initializes a first mask index MP1, a second mask index MP2 and a third counter, and initializes a detection signal detected_signal to be zero.

The controller 250 in step S602 updates the third counter to 950 MHz and uses the analog tuner 205 to fetch a section of spectrum. The controller 250 tunes the median frequency of the analog tuner 205 to 950 MHz to thereby produce a digital baseband signal. As shown at (A) of FIG. 13, it indicates a schematic diagram of fetching the section of spectrum in step S602 and of a spectrum generated by the DMF 235.

In step S603, the controller 250 arranges the first mask index MP1 and the second mask index MP2 in order to move the working window. As shown at (A) of FIG. 13, the first mask index MP1 is located at a position where a half of the bandwidth BW is subtracted from the DC part of the DMF 235. For example, if the working bandwidth BW of the DMF 235 is 45 MHz, the first mask index MP1 is located at −22.5 MHz. The controller 250 arranges a step size, and the digital mixer 220 shifts the spectrum of the digital baseband signal based on the step size. Namely, the step size is regarded as the spectrum resolution in the invention. The step size can be arranged to be smaller in order to observe the spectrum of a signal in details. In this case, the step size is 3 MHz. The second mask index MP2 is located at the right side of the first mask index MP1 by one step size. Namely, the second mask index MP2 is located at −19.5 MHz.

In step S605, the controller 250 determines whether a signal is detected in the spectrum generated by the DMF 235. When the frequency of the first cross point CP1 is greater than or equal to the frequency at the first mask index MP1, or when the detection signal detected_signal equals to one, it indicates that the signal is detected.

The range from the first mask index MP1 to the second mask index MP2 is defined as a working window. The first cross point CP1 is located at a position where the amplitude in the working spectrum is over a threshold at first time, and the second cross point CP2 is located at a position greater than CP1 where the amplitude in the working spectrum is below the threshold at first time. The threshold TH is expressed as follows:

TH=(Max−Min)×η+Min, where Max indicates an amplitude maximum of the working spectrum between the mask indexes MP1 and MP2, Min indicates an amplitude minimum of the working spectrum between the mask indexes MP1 and MP2, and η indicates a second tuning factor, for 0≤η≤1 and η is preferably 0.3.

Figure 13:
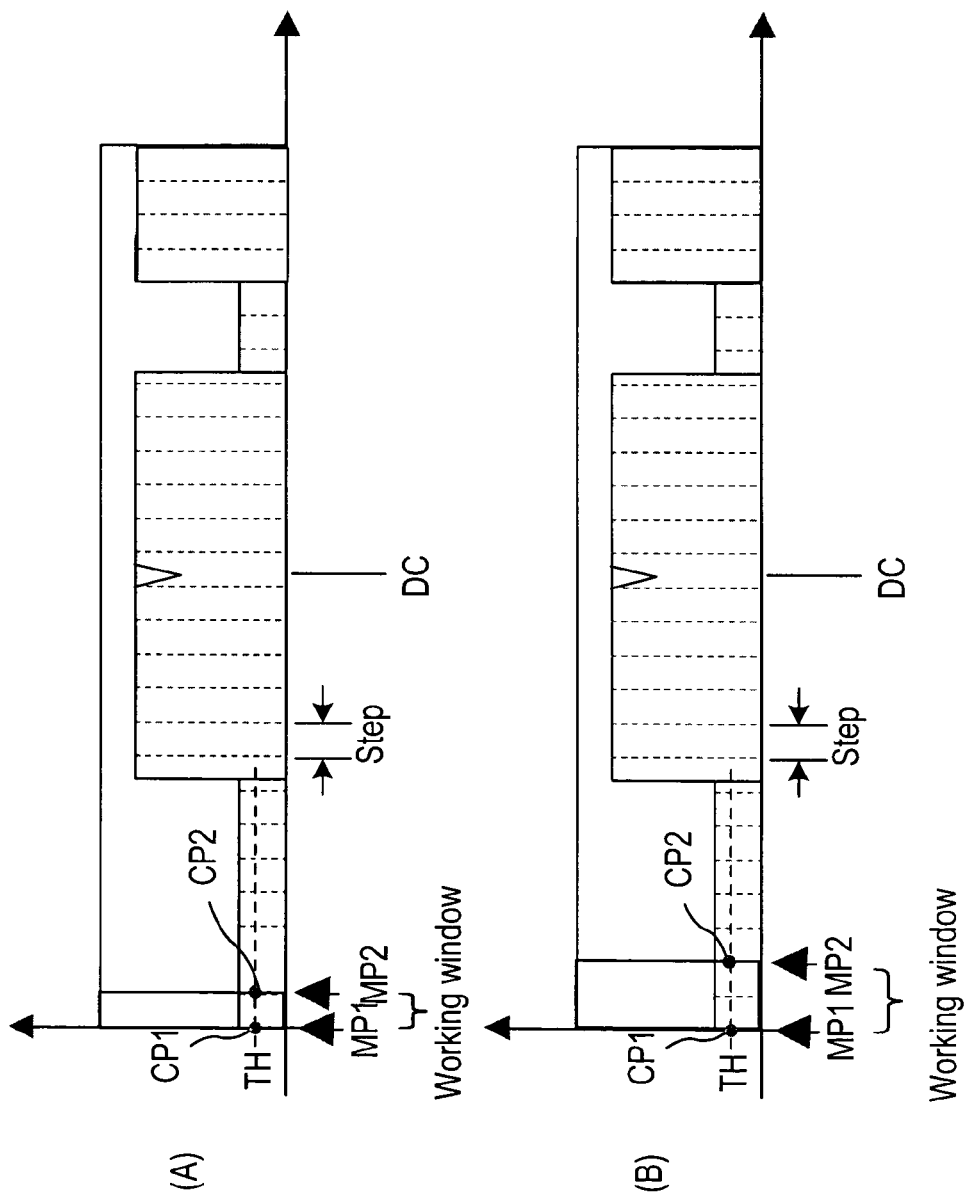

As shown at (A) of FIG. 13, the first cross point CP1 and the first mask index MP1 have the same frequency, and the second cross point CP2 and the second mask index MP2 have the same frequency.

Since the first cross point CP1 has the same frequency as the first mask index MP1 and the detection signal detected_signal contains zero, the controller 250 in step S605 decides that the signal is not detected, and step S610 is executed.

When the second mask index MP2 in step S610 does not touch the right side of the working bandwidth BW of the DMF 235, the controller 250 decides that the section of spectrum is not scanned completely. Namely, when the frequency at the second mask index MP2 is smaller than the frequency at the right side of the working bandwidth BW of the DMF 235, the controller 250 decides that the section of spectrum is not scanned completely, and when the frequency at the second mask index MP2 is greater than or equal to the frequency at the right side of the working bandwidth BW of the DMF 235, the controller 250 decides that the section of spectrum is scanned completely. When the first boundary B1 equals to the frequency at the right side of the working bandwidth of the DMF 235, the second mask index MP2 is used to determine whether the section of spectrum is scanned completely. Namely, when the second mask index MP2 is greater than or equal to the first boundary B1, it is decided that the section of spectrum is scanned completely.

In step S611, the controller 250 updates the second mask index MP2 in order to move the working window. Namely, the controller 250 adds one step size to the second mask index MP2 to thereby enlarge the working window, as shown at (B) of FIG. 13, and step S605 is executed. The cited steps are repeated to continuously enlarge the working window if the signal is not detected.

As shown at (A) and (B) of FIG. 13, only noises are included in the working window, so the threshold is smaller. As shown at (A) of FIG. 14, when the working window contains a signal, the threshold becomes greater. Accordingly, since the position where a frequency in the working window is over the threshold at first time is defined as the first cross point CP1, the frequency of the first cross point CP1 becomes larger. In this case, the frequency of the first cross point CP1 is greater than or equal to the frequency at the first mask index MP1, so that the controller 250 in step S605 decides that the signal is detected, and step S606 is executed.

In step S606, the controller 250 updates the first mask index MP1 to the frequency of the first cross point CP1, and assigns one to the detection signal detected_signal.

Step S607 determines whether the spectrum of the signal is included in the DMF 235. As shown in (A) of FIG. 14, the controller 250 decides that the spectrum of the signal is not included in the DMF 235 because the frequency of the second cross point CP2 equals to the frequency at the second mask index MP2. In this case, steps S610 and S611 are executed to enlarge the working window. When step S605 is executed again, steps S606 and S607 are executed as the detection signal detected_signal equals to one. The cited steps are repeated until the spectrum of the signal is included in the DMF 235.

Figure 14:
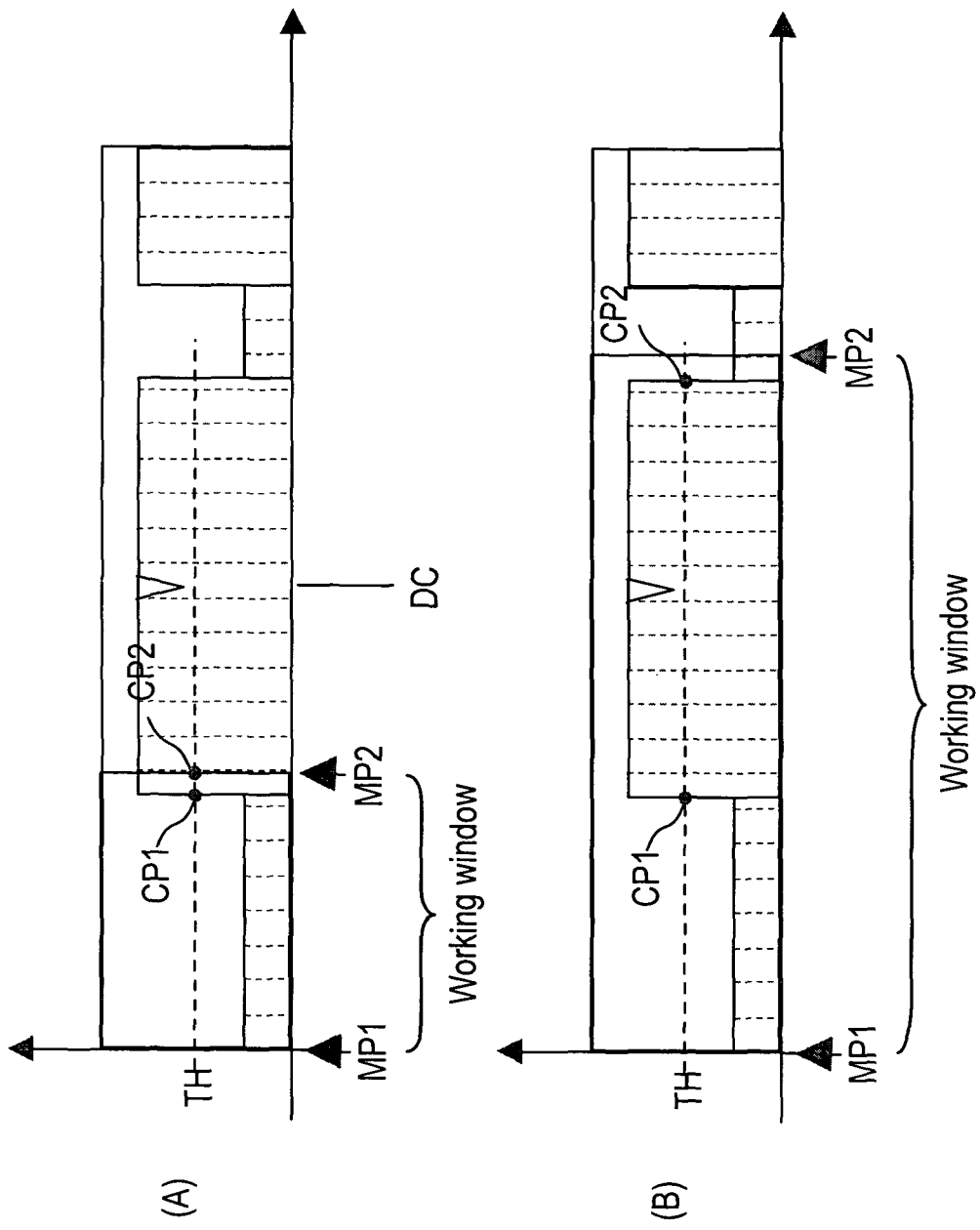

As shown at (B) of FIG. 14, when the working window contains the signal, i.e, the spectrum of the signal is included in the DMF 235, the frequency of the second cross point CP2 is smaller than the frequency at the second mask index MP2, so that step S607 decides that the spectrum of the signal is included in the DMF 235, and the controller 250 in step S608 extracts the parameters of the signal. The controller 250 in step S609 updates the first and the second mask indexes MP1 and MP2, as shown at (A) of FIG. 15. The controller 250 assigns zero to the detection signal detected_signal.

Figure 15:
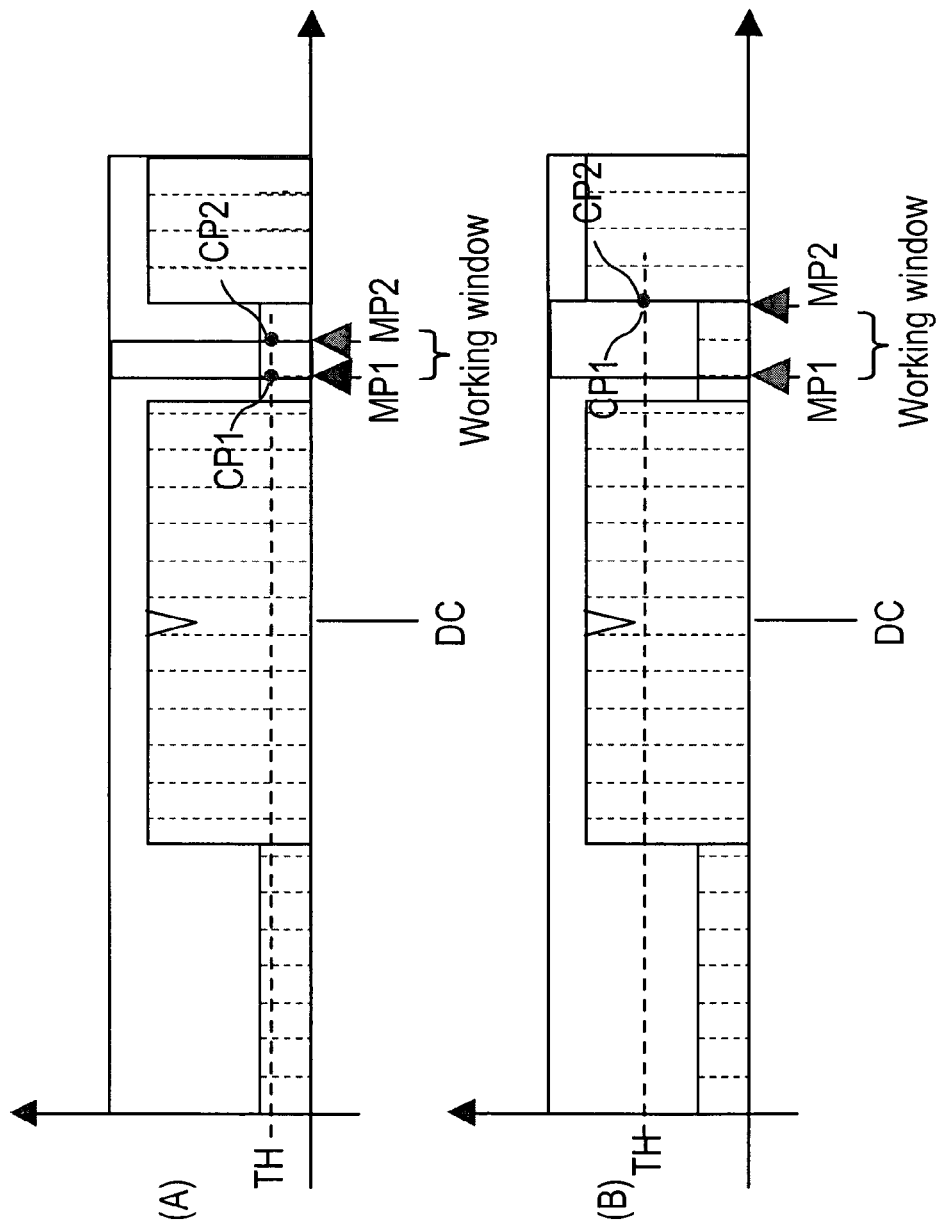
Figure 16:
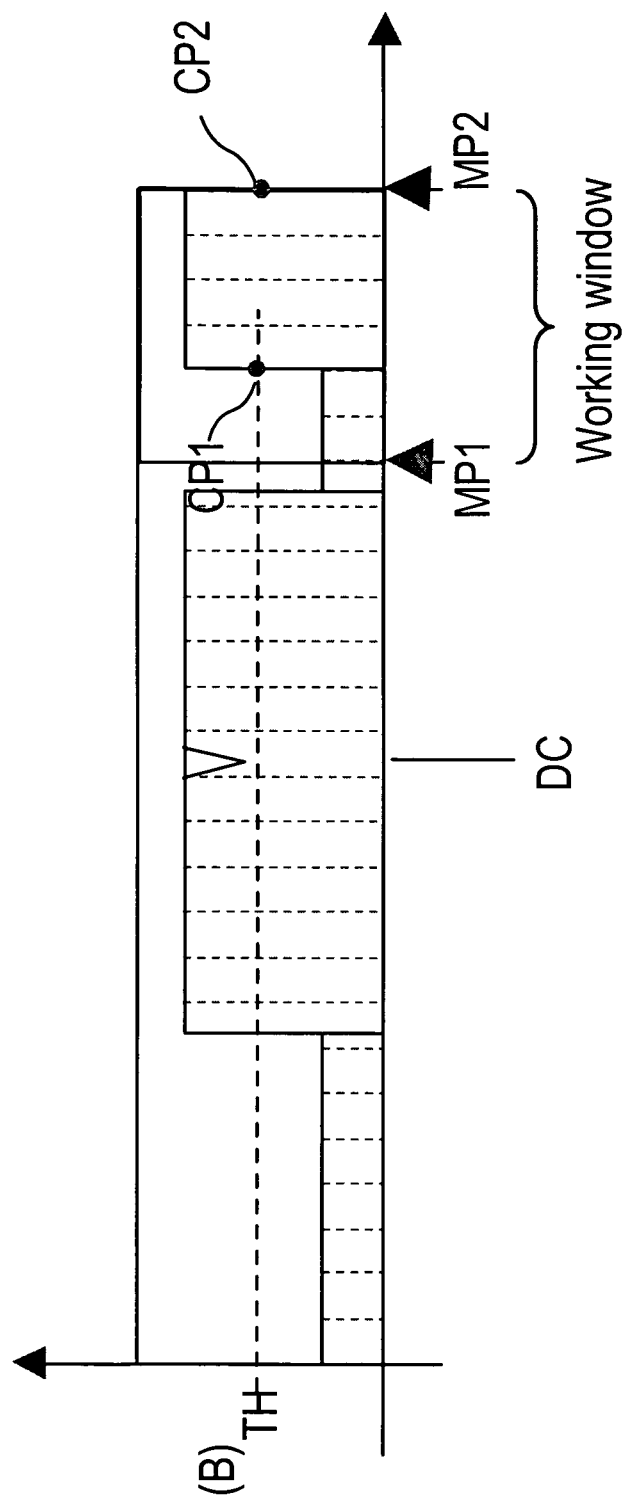

As shown at (B) of FIG. 15 and (A) of FIG. 16, the cited steps are repeated. As shown at (A) of FIG. 16, since the second mask index MP2 touches the right side of the working bandwidth BW of the DMF 235, the controller 250 decides that the section of spectrum is completely scanned, and step S612 is executed.

In step S612, the controller 250 determines whether a search range of spectrum (950 to 2150 MHz) is completely scanned. The controller 250 in step S612 decides that the search range of spectrum (950 to 2150 MHz) is not scanned completely when the third counter contains a value not equal to 2150 MHz, and step 613 is executed to tune the analog tuner 205 to fetch a next section of spectrum. Next, step S603 is executed. When the controller 250 in step S612 decides that the search range of spectrum is scanned completely, step S614 is executed to end the process.

Since the spectrum at the left side of the first mask index MP1 is scanned, the controller 250 depends on the bandwidth of the channel filter of the analog tuner 205, the bandwidth of the ADC, and the bandwidth of the DMF 235 to calculate and tune the carrier frequency of the analog tuner 205 to thereby arrange a signal within a certain section of spectrum fetched by the analog tuner 205 in step S602 to include the working spectrum not scanned for further scanning. In step S612, the carrier frequency is used to arrange the third counter to thereby determine whether the search range (950 to 2150 MHz) is completely scanned. When the third counter contains a value greater than or equal to 2150 MHz, the controller 250 decides that the search range (950 to 2150 MHz) is completely scanned.

In this embodiment, the analog tuner 205 is required, and the digital mixer 220 is seldom used. In addition, only the two indexes MP1 and MP2 are moved, so the frequency scan is faster than that in the first embodiment.

In this embodiment, the spectrum is scanned from low to high frequency. However, the scanning scheme can be easily changed into a high to low frequency scan by those skilled in the art. In this embodiment, for convenient description, the DMF 235 is regarded as an ideal filter. For a practical DMF 235, those skilled in the art can easily determine the two boundaries B1, B2 in accordance with the invention, and thus a detailed description is deemed unnecessary.

In summary, the invention includes the features as follows:

(1) The invention jointly employs the analog tuner 205 and the digital mixer 220 to scan a channel to thereby provide a reliable blind scan procedure. The analog tuner 205 uses a wider step size to shift a spectrum to thereby fetch a new section of spectrum in analog domain, and the digital mixer 220 can subsequently detect a channel and associated parameters in digital domain.

(2) The invention is based on the coarse symbol rate to use the interpolator to perform a down-sampling thereby increase the resolution and in-band SNR of the observed spectrum in digital domain. In contrary to prior art, this invention can effectively reduce or avoid high error rate of symbol rate estimation in a non-linear spectrum analysis and possible threshold effect in a carrier frequency estimation. In addition, the invention uses a cascaded integrator and comb filter (CIC) to cancel aliasing introduced by down-sampling. Thus, the accuracy of the parameter estimation is relatively improved, so the configuration for the parameters of the filter bandwidth is unnecessary, and dependence on points of FFT is skillfully mitigated.

(3) The invention has no need to preset the threshold of power level, but adaptively determines the threshold according to the spectrum observed in every calculating loop.

(4) Due to the DC blocking circuit between the analog tuner and the ADC, the notch is produced in working spectrum. However, the invention can improve the parameter and data detection in a narrowband to provide more accurate detection.

(5) The invention provides two embodiments of the blind scan procedure in a DVB-S system, and the first to fourth features above are used in the embodiments to determine the working window in digital domain. One embodiment in FIG. 7 uses a cyclic step shifting to program or tune the digital mixer 220, and the other embodiment in FIG. 12 uses an expanded step working window to program the digital mixer 220. Both of these embodiments fetch a section of spectrum through the analog tuner 205 first, and then detect a signal in the section spectrum in digital domain. Accordingly, it is able to reduce the number of channel filters for programming the analog tuner 205, so as to achieve a rapid blind scan procedure.

In view of the foregoing, it is known that the invention uses the spectrum parameter extractor to detect and calculate a coarse carrier frequency offset and coarse symbol rate of the signal, the digital mixer to shift the spectrum of the signal to the DC of the working spectrum of the digital matched filter (DMF), and the interpolator to enlarge the spectrum width of the signal in order to make the spectrum fill up the working spectrum of the DMF to thereby calculate the carrier frequency offset and symbol rate more accurate than the prior art. Therefore, the invention provides more flexibility than the prior art which is limited by the resolution of the analog tuner.

Although the present invention has been explained in relation to its preferred embodiment, it is to be understood that many other possible modifications and variations can be made without departing from the spirit and scope of the invention as hereinafter claimed.

What is claimed is:

1. A blind scan system in a DVB-S system, comprising:
an analog tuner for receiving a radio frequency (RF) signal of an antenna and tuning the RF signal down to a baseband according to a designated analog carrier frequency offset so as to produce an analog baseband signal;
an analog to digital converter (ADC) connected to the analog tuner for converting the analog baseband signal into a digital baseband signal;
a digital mixer for receiving the digital baseband signal and performing a frequency shifting on the digital baseband signal based on a digital carrier frequency offset, so as to produce an offset baseband signal;
a digital auto-gain controller (DAGC) connected to the digital mixer for performing an auto-gain adjustment on the offset baseband signal to produce a gain adjusted baseband signal;
a digital matched filer (DMF) connected to the digital AGC for filtering the gain adjusted baseband signal to produce a filtered baseband signal;
a spectrum computation device connected to the digital matched filter for calculating and producing a spectrum of the filtered baseband signal;
a spectrum parameter extractor connected to the spectrum computation device for calculating first and second cross points of the spectrum of the filtered baseband signal with a threshold based on a control signal configured by a controller, so as to calculate a coarse carrier frequency offset and a fine carrier frequency offset of the spectrum, and a fine symbol rate and a coarse symbol rate of the digital baseband signal, and generating the first cross point, the second cross point, the coarse carrier frequency offset, the fine carrier frequency offset, the coarse symbol rate, and the fine symbol rate to the controller; and
the controller connected to the analog tuner, the digital mixer, the spectrum computation device and the spectrum parameter extractor for deciding the analog carrier frequency offset according to a search range of spectrum, and determining whether a signal is detected in the spectrum of the filtered baseband signal generated by the DMF, wherein, when there is no signal detected, the controller controls the analog tuner to shift main component of a spectrum of a signal under test to a working bandwidth of the DMF thereby acquiring parameters of the signal under test, calculates a digital carrier frequency offset of the spectrum of the signal under test based on a coarse carrier frequency offset of the spectrum of the signal under test, and controls the digital mixer to perform a frequency shifting on the digital baseband signal;
wherein the analog tuner fetches a section of spectrum from the search range of spectrum and produces the analog baseband signal based on an analog carrier frequency offset designated by the controller, where the analog carrier frequency offset is a start of the search range of spectrum, and the controller arranges a first boundary and a second boundary based on the working bandwidth of the DMF, arranges a first mask index based on the working bandwidth and direct current (DC) part of the DMF, determines whether a signal is detected in the spectrum generated by the DMF based on whether the first cross point generated by the spectrum parameter extractor is greater than or equal to the first mask index, and determines whether a spectrum of the signal detected is included in the DMF based on whether the first cross point touches the second boundary or whether the second cross point touches the first boundary.

2. The blind scan system as claimed in claim 1, wherein a distance between the first boundary and the second boundary equals to a width of a passband of the DMF, the first boundary is located at a right side of the working bandwidth of the DMF, the second boundary is located at a left side of the working bandwidth of the DMF, and the first mask index is located at a position where a half of the bandwidth of the DMF is subtracted from the DC part of the DMF.

3. The blind scan system as claimed in claim 2, wherein a frequency of the first cross point is smaller than or equal to the second boundary to indicate that the first cross point touches the second boundary, and a frequency of the second cross point is smaller than or equal to the first boundary to indicate that the second cross point touches the first boundary.

4. The blind scan system as claimed in claim 3, wherein the controller includes a first counter and a second counter, the digital mixer depends on a step size designated by the controller and regarded as a spectrum resolution to shift a spectrum of the digital baseband signal for producing an offset baseband signal, the controller reduces one step size in both the first mask index and the first counter while the digital mixer shifts the spectrum of the digital baseband signal by one step size, until the controller decides that the spectrum of the signal is included in DMF, the controller decides that the section of spectrum is scanned completely when the first counter is smaller than or equal to zero, the controller assigns the second counter equal to a start of the search range of spectrum, and the controller determines whether the search range of spectrum is scanned completely based on whether the second counter equals to the maximum of the search range of spectrum.

5. The blind scan system as claimed in claim 1, wherein the analog tuner fetches a section of spectrum from the search range of spectrum and produces the analog baseband signal based on an analog carrier frequency offset designated by the controller, where the analog carrier frequency offset is a start of the search range of spectrum, and the controller is based on the working bandwidth and DC part of the DMF to arrange a first mask index, locates a second mask index at a right side of the first mask index by one step size, uses the first mask index and the second mask index to move a working window, determines whether a signal is detected in the spectrum generated by the DMF based on whether the first cross point generated by the spectrum parameter extractor is greater than or equal to the first mask index, and determines whether a spectrum of the signal detected is included in the DMF based on whether a frequency of the second cross point is smaller than a frequency of the second boundary.

6. The blind scan system as claimed in claim 5, wherein the first mask index is located at a position where a half of the bandwidth of the DMF is subtracted from the DC part of the DMF.

7. The blind scan system as claimed in claim 6, wherein the controller includes a third counter equal to a start of the search range of spectrum to decide that the search range of spectrum is scanned completely when the third counter equals to the maximum of the search range of spectrum.

8. The blind scan system as claimed in claim 1, further comprising an interpolator connected to the digital mixer, the DAGC and the controller, so that the controller calculates a down-sampling factor based on the coarse symbol rate generated by the spectrum parameter extractor, the interpolator receives the down-sampling factor to perform an interpolation operation on the offset baseband signal generated by the digital mixer and thus produces an interpolated offset baseband signal, and the DAGC receives the interpolated offset baseband signal to produce the gain adjusted baseband signal for output to the DMF.

9. The blind scan system as claimed in claim 1, further comprising a tuner auto-gain controller (AGC) connected to the ADC and the analog tuner for automatically tuning a gain of the analog tuner based on the digital baseband signal.

10. The blind scan system as claimed in claim 8, wherein the interpolator includes a cascaded integrator and comb filter (CIC).

11. The blind scan system as claimed in claim 1, wherein the spectrum computation device includes:
 a first multiplexer having a first input terminal connected to the DMF for receiving the filtered baseband signal;
 an N-point fast Fourier transform (N-FFT) device connected to the first multiplexer for performing a Fourier transform on an output signal of the first multiplexer;
 a bin energy calculator connected to the N-FFT for calculating an energy of each bin out of the N-FFT;
 an accumulator connected to the bin energy calculator for accumulating output signals of the calculator to obtain a spectrum;
 a Cordic device connected to the digital matched filter (DMF) for performing a Cordic operation on the filtered baseband signal;
 a 4-times phase device connected to the Cordic device and a second input terminal of the first multiplexer for performing a 4-times phase operation on a signal generated by the Cordic device for output to the second input terminal of the first multiplexer;
 a lagged autocorrelator connected to the DMF and a third input terminal of the first multiplexer for calculating an autocorrelation signal for the filtered baseband signal for output to the third input terminal of the first multiplexer;
 an equalizer connected to the accumulator for performing an equalization operation on a signal generated by the accumulator; and
 a second multiplexer having a first input terminal and a second input terminal connected to the accumulator and a third input terminal connected to the equalizer for selecting input signals from its first and second input terminals or an input signal from its third terminal as an output signal according to a control signal.

12. The blind scan system as claimed in claim 1, wherein the spectrum parameter extractor includes:
 a first de-multiplexer connected to the spectrum computation device for generating the output signal of the spectrum computation device through its first or second output terminal and its third output terminal according to the control signal;
 a moving average device connected to a first output terminal of the first demultiplexer for performing a moving average operation on a spectrum generated by the spectrum computation device to produce a smooth spectrum;
 a cross point search device connected to the moving average device for finding and generating a first cross point and a second cross point of the smooth spectrum;
 a first adder connected to the cross point search device for adding the first and the second cross points;
 a divider connected to the adder for producing the coarse carrier frequency offset;
 a second adder connected to the cross point search device for subtracting the second cross point from the first cross point to produce the coarse symbol rate for the digital baseband signal;
 a peak detector connected to a second output terminal and a third output terminal of the first demultiplexer for performing a peak detection on the spectrum generated by the spectrum computation device to produce a peak location index for the spectrum;
 a second de-multiplexer connected to the peak detector for selecting its second or third output terminal to generate an output signal of the peak detector according to the control signal to; and
 a fine carrier frequency offset calculator connected to the second demultiplexer for calculating a fine carrier frequency offset according to the peak location index; and
 a fine symbol rate calculator connected to the second demultiplexer for calculating a fine symbol rate according to the peak location index.

13. The blind scan system as claimed in claim 10, wherein the down-sampling factor is expressed as:

$$DSF = \frac{BW_{DMF}}{C\_SR \times \varsigma},$$

where DSF indicates the down-sampling factor, $BW_{DMF}$ indicates the bandwidth of the DMF, C_SR indicates the estimated coarse symbol rate, and $\varsigma$ indicates a first tuning factor.

14. The blind scan system as claimed in claim 1, wherein the first cross point is locates at a position where the amplitude of the smooth spectrum is over a threshold at first time, and the second cross point is located at a position greater than CP1 where the amplitude of the smooth spectrum is below the threshold at first time, and wherein the threshold TH is expressed as:

$$TH = (Max - Min) \times \eta + Min,$$

where Max indicates an amplitude maximum of the smooth spectrum between two mask indexes, Min indicates an amplitude minimum of the smooth spectrum between the two mask indexes, and η indicates a second tuning factor.

15. A blind scan method in a DVB-S system, comprising the steps of:
  (A) initializing system parameters;
  (B) tuning an analog tuner to fetch a section of spectrum according to a search range of spectrum;
  (C) tuning the analog tuner for moving a spectrum of a signal under test, and configuring a digital mixer for performing a frequency shifting on a digital baseband signal to produce an offset baseband signal;
  (D) using a controller to determine whether a signal is detected, and, if yes, executing step (E), otherwise executing step (G);
  (E) determining whether a spectrum of the signal is contained in a digital matched filter (DMF) and, if yes, executing step (F), otherwise executing step (G);
  (F) extracting parameters of the spectrum of the signal, calculating a digital carrier frequency offset of the spectrum contained in the DMF according to a coarse carrier frequency offset of the spectrum contained in the DMF, and configuring the digital mixer to perform the frequency shifting on the digital baseband signal;
  (G) determining whether the section of spectrum is completely scanned and, if yes, executing step (H), otherwise executing step (I);
  (H) determining whether the search range of spectrum is completely scanned when the section of spectrum is completely scanned, and, if yes, ending the method, otherwise tuning the analog tuner to fetch next section of spectrum and executing step (C); and
  (I) tuning the analog tuner for moving the spectrum of the signal under test, configuring the digital mixer for performing the frequency shifting on the digital baseband signal to produce an offset baseband signal, and executing step (D);
  wherein in steps (C) and (I), tuning the analog tuner for moving the spectrum of the signal under test is achieved by updating a first mask index, wherein step (D) decides that the signal is detected when a frequency of a first cross point is greater than or equal to a frequency at the first mask index, and wherein step (E) decides that the spectrum of the signal is included in the DMF when the first cross point touches a second boundary or a second cross point touches a first boundary.

16. The method as claimed in claim 15, wherein the frequency of the first cross point is smaller than or equal to the second boundary to indicate that the first cross point touches the second boundary, or a frequency of the second cross point is smaller than or equal to the first boundary to indicate that the second cross point touches the first boundary.

17. The method as claimed in claim 15, wherein a distance between the first and the second boundaries equals to a width of a passband of the DMF, the first boundary is located at a right side of a working bandwidth of the DMF, the second boundary is located at a left side of the working bandwidth of the DMF, and the controller locates the first mask index at a position where a half of the bandwidth of the DMF is subtracted from the DC part of the DMF.

18. The method as claimed in claim 15, wherein step (G) includes the steps of:
  (G1) the digital mixer shifting a spectrum of the digital baseband signal based on a step size designated by the controller and regarded as a spectrum resolution to produce the offset baseband signal;
  (G2) the controller reducing the first mask index and a first counter by one step size while the digital mixer shifting the spectrum of the digital baseband signal by one step size, until the controller decides that the spectrum of the signal is included in the DMF; and
  (G3) using the first counter to decide whether the section of spectrum is scanned completely, and deciding that the section of spectrum is scanned completely when the first counter is smaller than or equal to zero.

19. The method as claimed in claim 15, wherein step (H) includes the steps of:
  (H1) the controller assigning a start of the search range of spectrum to a second counter;
  (H2) using the second counter to decide whether the search range of spectrum is scanned completely, and deciding that the search range of spectrum is scanned completely when the second counter equals to the maximum of the search range of spectrum.

20. The method as claimed in claim 15, wherein in steps (C) and (I), tuning the analog tuner for moving the spectrum of the signal under test is achieved by moving a working window and updating a first mask index and a second mask index, wherein step (D) decides that the signal is detected when a frequency of a first cross point is greater than or equal to a frequency at the first mask index, and wherein step (E) decides that the spectrum of the signal is included in the DMF when a frequency of a second cross point is smaller than a frequency at the second mask index.

21. The method as claimed in claim 20, wherein the first mask index is located at a position where a half of the bandwidth of the DMF is subtracted from the DC part of the DMF, and the second mask index is located at a right side of the first mask index by a step size regarded as a spectrum resolution.

22. The method as claimed in claim 20, wherein step (H) includes the steps of:
  (H1) the controller assigning a start of the search range of spectrum to a third counter;
  (H2) using the third counter to decide whether the search range of spectrum is scanned completely, and deciding that the search range of spectrum is scanned completely when the third counter equals to the maximum of the search range of spectrum.

23. The method as claimed in claim 15, wherein step (F) includes an interpolating step for depending on a down-sampling factor generated by the controller to perform an interpolation operation on the offset baseband signal generated by the digital mixer to produce an interpolated offset baseband signal.

24. The method as claimed in claim 23, wherein the down-sampling factor is expressed as:

$$DSF = \frac{BW_{DMF}}{C\_SR \times \varsigma},$$

where DSF indicates the down-sampling factor, $BW_{DMF}$ indicates a bandwidth of the DMF, C_SR indicates a coarse symbol rate, and ζ indicates a first tuning factor.

25. The method as claimed in claim 15, wherein the first cross point is located at a position where a frequency of a smooth spectrum is over a threshold at first time, and the second cross point is located at a position where a frequency of the smooth spectrum is below the threshold at first time, and wherein the threshold TH is expressed as:

$$TH = (Max - Min) \times \eta + Min,$$

where Max indicates an amplitude maximum of the smooth spectrum between two mask indexes, Min indicates an amplitude minimum of the smooth spectrum between the two mask indexes, and $\eta$ indicates a second tuning factor.

26. The method as claimed in claim 15, further comprising a step between steps (C) and (D) for waiting a tuner auto-gain controller and a digital auto-gain controller to be stable.

* * * * *